US012695371B2

(12) United States Patent     (10) Patent No.:   US 12,695,371 B2

Liu et al.     (45) Date of Patent:     Jul. 28, 2026

(54) CASCADED POWER CONVERSION SYSTEM AND POWER DISTRIBUTION METHOD THEREOF

(71) Applicant: Delta Electronics (Shanghai) Co., Ltd., Shanghai (CN)

(72) Inventors: Hong Liu, Shanghai (CN); Yuxin Han, Shanghai (CN); Wen Zhang, Shanghai (CN); Weiqiang Zhang, Shanghai (CN); Junshan Lou, Shanghai (CN); Xing Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 286 days.

(21) Appl. No.: 18/633,530

(22) Filed: Apr. 12, 2024

(65) Prior Publication Data

US 2024/0356427 A1     Oct. 24, 2024

(30) Foreign Application Priority Data

Apr. 17, 2023    (CN) .......................... 202310411891.9
    Apr. 3, 2024    (CN) .......................... 202410405837.8

(51) Int. Cl.
    *H02M 1/00*       (2007.01)
    *H02J 3/46*       (2006.01)

(52) U.S. Cl.
    CPC .............. *H02M 1/007* (2021.05); *H02J 3/46* (2013.01)

(58) Field of Classification Search
    CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18;

(Continued)

(56) References Cited

U.S. PATENT DOCUMENTS

2003/0218887 A1*   11/2003   Kojori ................... H02M 7/797
                                          363/16
2018/0183335 A1     6/2018   Fan et al.

(Continued)

FOREIGN PATENT DOCUMENTS

CN       110768563   B     3/2021
CN       113595415   A    11/2021
EP         0881758   B1    6/2004

OTHER PUBLICATIONS

Praneeth A V J S et al: "A Variable DC 4 Link Voltage in On-board Battery Chargers for Electric Vehicle Charging Application", IEEE Dec. 18, 2018.

*Primary Examiner* — Crystal L Hammond
*Assistant Examiner* — Nusrat Quddus
(74) *Attorney, Agent, or Firm* — KIRTON McCONKIE; Evan R. Witt

(57)             ABSTRACT

A cascaded power conversion system is used for receiving an AC input power having an AC input voltage. The cascaded power conversion system includes N power conversion modules. Each of the N power conversion modules includes an AC/DC conversion unit, a DC bus and a DC/DC conversion unit. In every ¼ period of the AC input voltage, the DC/DC conversion units of the N power conversion modules are operated in a bypass mode, a boost mode and a hold mode, and a total voltage of DC bus voltages of the N power conversion modules are changed in a consecutive manner.

23 Claims, 32 Drawing Sheets

(58) Field of Classification Search
CPC ... G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 7/519; H02M 7/521; H02M 7/523; H02M 7/75; H02M 7/757; H02M 7/7575; H02M 7/66; H02M 7/68; H02M 7/72; H02M 2007/4835; H02M 7/487; H02M 1/08; H02M 7/515; H02M 7/525; H02M 7/527; H02M 7/529; H02M 7/539; H05B 39/048; B23K 11/24; H04B 2215/069; H02J 3/46; H02J 3/38
See application file for complete search history.

(56) References Cited

U.S. PATENT DOCUMENTS

| | | | |
|---|---|---|---|
| 2022/0140739 A1* | 5/2022 | Liu | H02M 3/33576 |
| | | | 363/13 |
| 2022/0140746 A1* | 5/2022 | Liu | H02J 3/06 |
| | | | 363/71 |

* cited by examiner

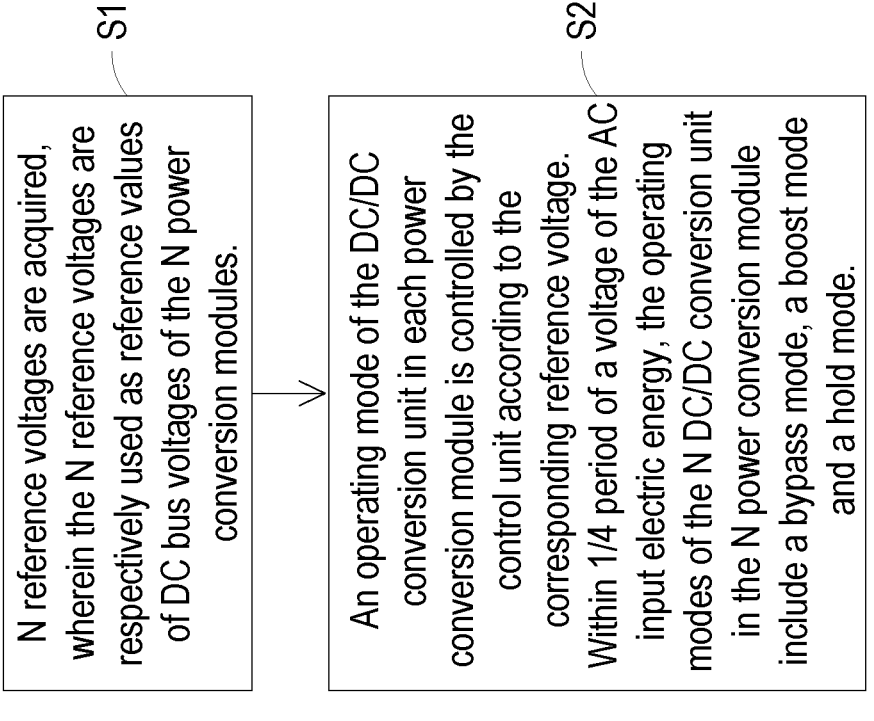

S1

N reference voltages are acquired, wherein the N reference voltages are respectively used as reference values of DC bus voltages of the N power conversion modules.

S2

An operating mode of the DC/DC conversion unit in each power conversion module is controlled by the control unit according to the corresponding reference voltage. Within 1/4 period of a voltage of the AC input electric energy, the operating modes of the N DC/DC conversion unit in the N power conversion module include a bypass mode, a boost mode and a hold mode.

FIG. 6

CASCADED POWER CONVERSION SYSTEM AND POWER DISTRIBUTION METHOD THEREOF

CROSS-REFERENCE TO RELATED APPLICATION

This application claims priorities to China Patent Application No. 202310411891.9, filed on Apr. 17, 2023 and China Patent Application No. 202410405837.8, filed on Apr. 3, 2024, the entire contents of which are incorporated herein by reference for all purposes.

FIELD OF THE INVENTION

The present disclosure relates to a conversion system, and more particularly to a cascaded power conversion system and a power distribution method for the cascaded power conversion system.

BACKGROUND OF THE INVENTION

As known, solid-state transformers (SST) such as cascaded solid-state transformers have broad application prospects in DC power devices and DC power generation devices, such as data centers, electric vehicle charging stations (swapping stations), photovoltaics systems, energy storage devices.

FIG. 1A is a schematic circuit diagram illustrating the circuitry topology of a conventional solid-state transformer. As shown in FIG. 1A, the input terminals of a plurality of modules are connected with each other in series. Consequently, the components withstanding the low voltage can be connected with each other in series to achieve the purpose of receiving a high input voltage. However, when the solid-state transformer is operated in a light load condition, the efficiency is low. In this situation, many bus capacitors are still required to filter the input voltage. For reducing the systematic loss and increasing the systematic efficiency, some methods of distributing power between the modules have been proposed.

Please refer to FIGS. 1A and 1B. FIG. 1B is a schematic waveform diagram illustrating associated voltages according to a first conventional technology. In FIG. 1B, Vg represents the input voltage received by the solid-state transformer as shown in FIG. 1A, Vb is the port voltage of the module, and Vc is the DC bus voltage of the module. Each module includes a front-stage conversion circuit and a rear-stage conversion circuit. The front-stage conversion circuit is an AC/DC conversion circuit. The rear-stage conversion circuit is a DC/DC conversion circuit. As shown in FIG. 1B, the AC/DC conversion circuit is always operated in a high frequency rectification mode. By controlling the port voltage Vb of the module, the purpose of uniformly distributing the power between the modules can be achieved. The DC bus voltages of the modules are equal. The DC/DC conversion circuit is always operated in a hold mode. That is, the switching frequency of the DC/DC conversion circuit is equal to the resonant frequency, and the operating mode is not changed with the input power. When the first conventional technology is used for power distribution, the AC/DC conversion circuit is operated in hard switching mode. Consequently, the switching loss is high. Moreover, since the DC/DC conversion circuit is always operated in the hold mode, the power loss of the transformer is high. Moreover, since the DC bus voltage Vdc of the module contains double-frequency ripple, the module needs to be equipped with the filtering capacitor with higher capacitance. Consequently, the cost is increased.

Please refer to FIGS. 1A and 1C. FIG. 1C is a schematic waveform diagram illustrating associated voltages according to a second conventional technology. The AC/DC conversion circuit (i.e., the front-stage conversion circuit) is operated in a power frequency rectification mode. When the second conventional technology is used for power distribution, the DC bus voltages Vdc of all modules are equal. In addition, the DC/DC conversion circuit (i.e., the rear-stage conversion circuit) is operated in a wide-range boost mode. Consequently, the on-state loss and the transformer core loss are high.

Therefore, there is a need of providing an improved cascaded power conversion system and a power distribution method for the cascaded power conversion system in order to overcome the drawbacks of the conventional technologies.

SUMMARY OF THE INVENTION

An object of the present disclosure is to provide a cascaded power conversion system and a control method for the cascaded power conversion system. The DC/DC conversion units in the N power conversion modules of the cascaded power conversion system are operated in a bypass mode, a boost mode and a hold mode. When the DC/DC conversion unit is operated in the bypass mode or the boost mode, the switching loss of the DC/DC conversion unit is low, and the power loss of the transformer in the DC/DC conversion unit is low. When the DC/DC conversion unit is operated in the hold mode or the bypass mode, the on-state loss of the DC/DC conversion unit is low. Moreover, when the AC/DC conversion unit of the power conversion module receives the AC input electric energy, the DC output electric energy is immediately outputted from the DC/DC conversion unit. Since it is not necessary to store electric energy in the bus capacitor of the DC bus of the power conversion module, the bus capacitor with a low capacitance value and a small volume is feasible. Consequently, the cost of the cascaded power conversion system is reduced.

In accordance with an aspect of the present disclosure, a cascaded power conversion system is provided. The cascaded power conversion system includes N power conversion modules. Each of the N power conversion modules includes an input terminal, an output terminal, a DC bus, an AC/DC conversion unit and a DC/DC conversion unit. The DC bus has a DC bus voltage. The AC/DC conversion unit is electrically connected between the input terminal and the DC bus. The DC/DC conversion unit is electrically connected between the DC bus and the output terminal. The input terminals of the N power conversion modules are electrically connected between two terminals of the input power source to receive an AC input power having an AC input voltage. In every ¼ period of the AC input voltage, the DC/DC conversion units of the N power conversion modules are operated in a bypass mode, a boost mode and a hold mode. A total voltage of the DC bus voltages of the N power conversion modules are changed in a consecutive manner.

In accordance with another aspect of present disclosure, a power distribution method for a cascaded power conversion system is provided. The cascaded power conversion system includes N power conversion modules for receiving an AC input power having an AC input voltage. Each of the N power conversion modules includes an AC/DC conversion unit, a DC bus and a DC/DC conversion unit. The power distribution method includes: acquiring N reference voltages; distributing the N reference voltages to the N power conversion modules respectively; and selecting an operating mode of the DC/DC conversion unit in each of the N power conversion modules from a bypass mode, a boost mode and a hold mode according to the corresponding reference voltage.

In accordance with another aspect of present disclosure, a cascaded power conversion system is provided. The cascaded power conversion system includes an AC/DC conversion unit, N DC buses and N DC/DC conversion units. An input terminal of the AC/DC conversion unit is electrically connected with the input power source to receive AC input power having an AC input voltage. The N DC buses are connected with an output terminal of the AC/DC conversion unit. An input terminal of each DC/DC conversion unit is electrically connected with a corresponding DC bus. In every ¼ period of the AC input voltage, the N DC/DC conversion units are operated in a bypass mode, a boost mode or a hold mode, and a total voltage of the DC bus voltages of the N DC/DC conversion units are changed in a consecutive manner.

The above contents of the present disclosure will become more readily apparent to those ordinarily skilled in the art after reviewing the following detailed description and accompanying drawings, in which:

BRIEF DESCRIPTION OF THE DRAWINGS

FIG. 6 is a flowchart of a power distribution method for a cascaded power conversion system according to an embodiment of the present disclosure;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
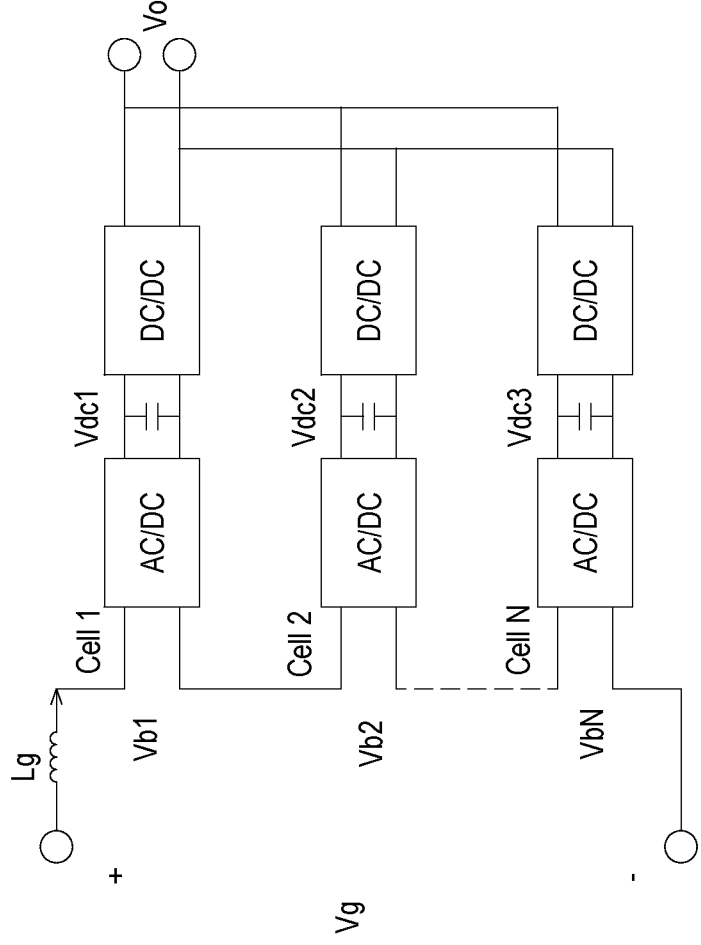
FIG. 1A is a schematic circuit diagram illustrating the circuitry topology of a conventional solid-state transformer.
Figure 1B:
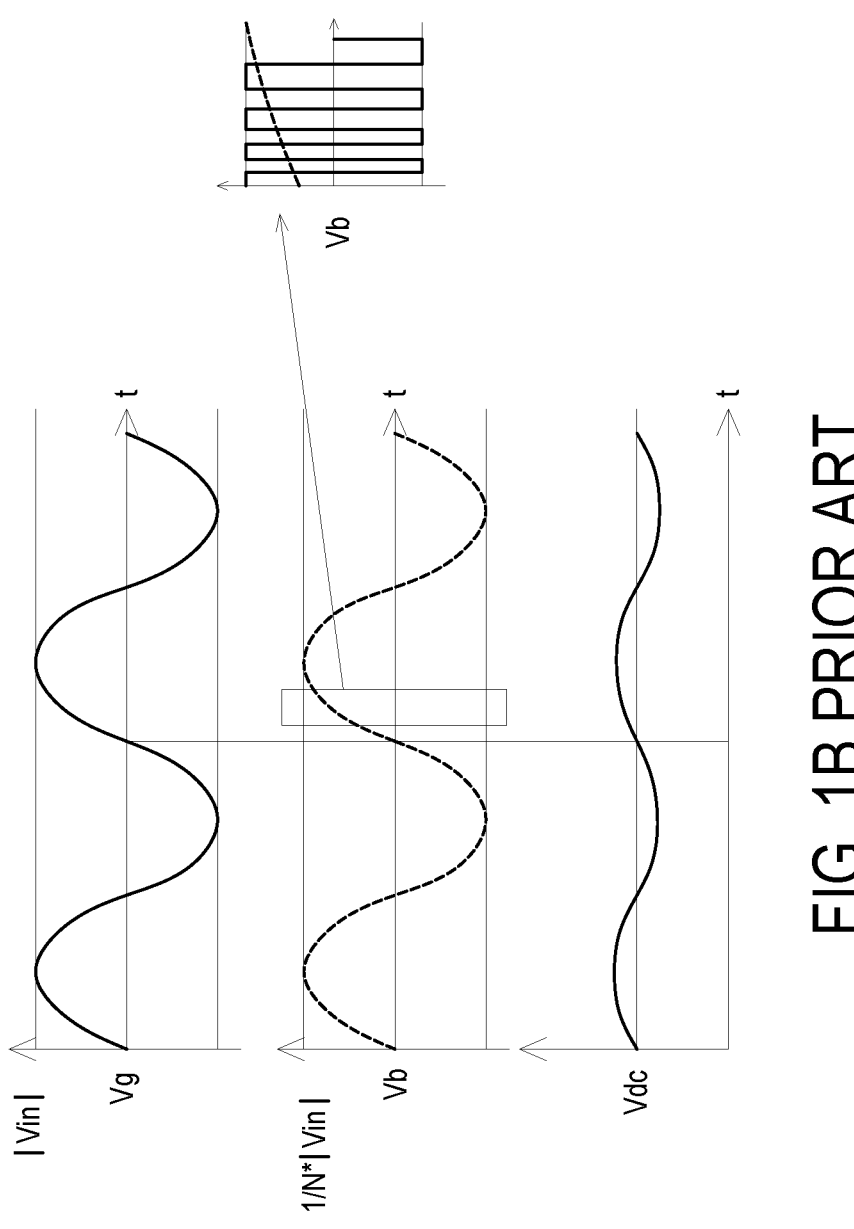
FIG. 1B is a schematic waveform diagram illustrating associated voltages according to a first conventional technology.
Figure 1C:
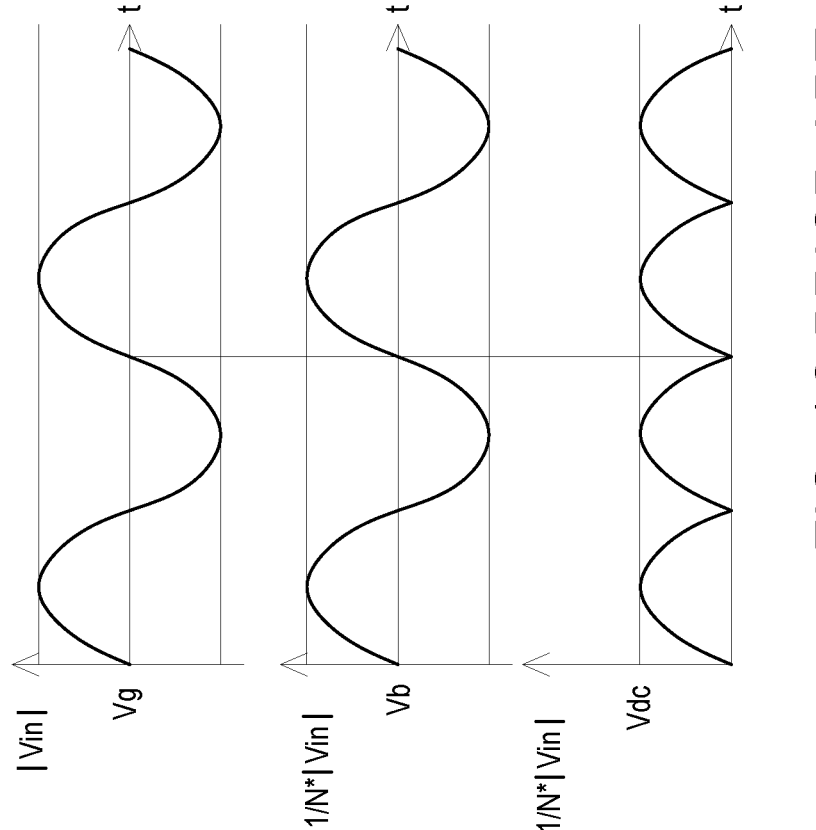
FIG. 1C is a schematic waveform diagram illustrating associated voltages according to a second conventional technology.
Figure 2A:
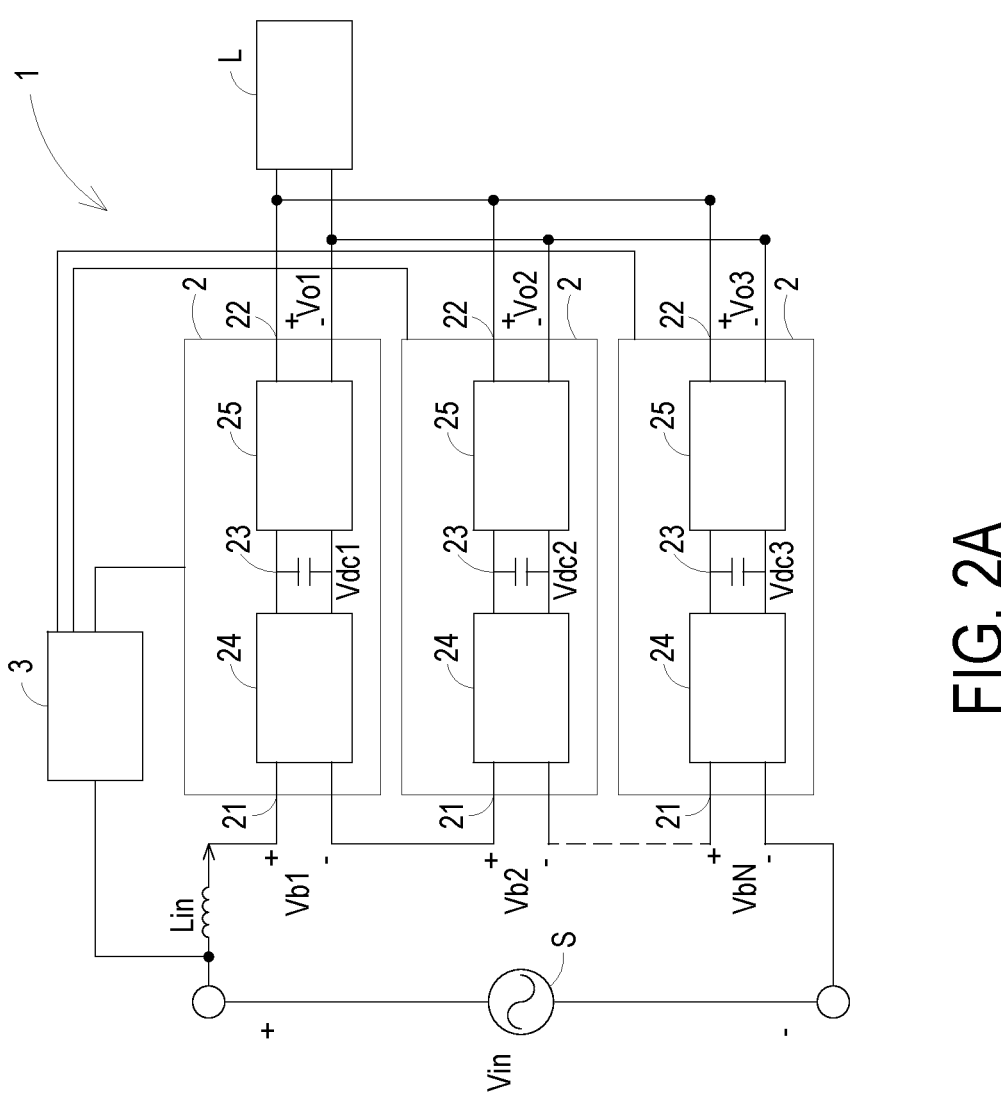
FIG. 2A is a schematic circuit diagram illustrating a cascaded power conversion system according to a first embodiment of the present disclosure.
Figure 2B:
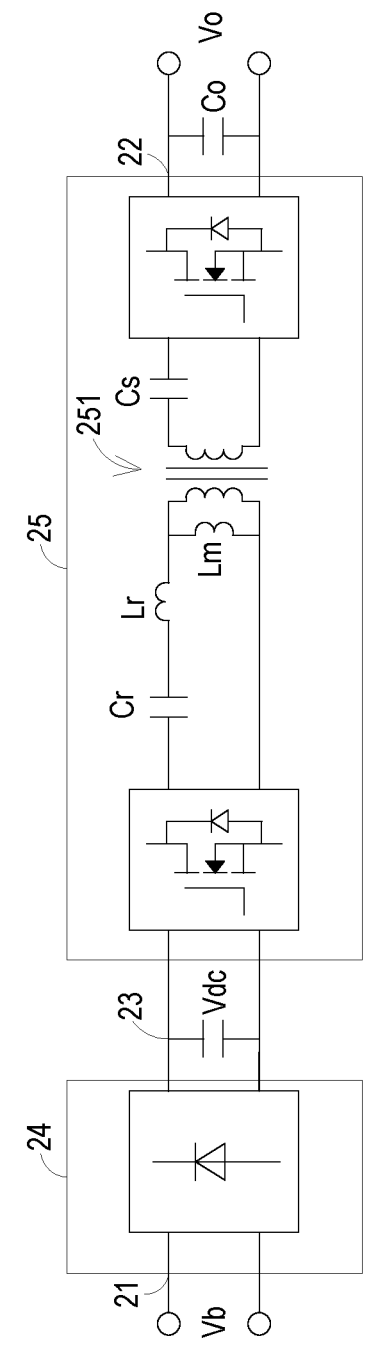
FIG. 2B is a schematic circuit diagram illustrating one power conversion module of the cascaded power conversion system as shown in FIG. 2A.

Please refer to FIGS. 2A and 2B. FIG. 2A is a schematic circuit diagram illustrating a cascaded power conversion system according to a first embodiment of the present disclosure. FIG. 2B is a schematic circuit diagram illustrating one power conversion module of the cascaded power conversion system as shown in FIG. 2A.

As shown in FIG. 2A, the cascaded power conversion system 1 is electrically connected between an input power source S and a load L. The cascaded power conversion system 1 receives AC input electric energy from the input power source S and converting the AC input electric energy into DC output electric energy. The DC output electric energy is transmitted to the load L. Preferably, the loading factor of the load L is lower than or equal to 50% of the rated loading factor. The load L is lower than or equal to 50% of the rated load.

The cascaded power conversion system 1 includes N power conversion modules 2 and a control unit 3. In the embodiment of FIG. 2A, the cascaded power conversion system 1 includes three power conversion modules 2 and the control unit 3. As shown in FIG. 2B, each power conversion module 2 includes an input terminal 21, an output terminal 22, a DC bus 23, an AC/DC conversion unit 24 and a DC/DC conversion unit 25.

As shown in FIG. 2A, the input terminals 21 of the N power conversion modules 2 are serially connected between the two terminals of the input power source S. The input terminals 21 of the N power conversion modules 2 receive the input voltages Vb1, Vb2, . . . , VbN, respectively. The input terminal 21 of the first power conversion module 2 is electrically connected with the positive terminal of the input power source S through an input inductor Lin. The input terminal 21 of the N-th power conversion module 2 is electrically connected with the negative terminal of the input power source S. The output terminals 22 of the N power conversion modules 2 are electrically connected with the load L. In addition, the output terminals 22 of the N power conversion modules 2 are connected with each other in parallel.

In each power conversion module 2, the DC bus 23 includes a bus capacitor. The bus capacitor has a DC bus voltage. The AC/DC conversion unit 24 is electrically connected between the input terminal 21 of the power conversion module 2 and the DC bus 23. The AC input electric energy from the input power source S is converted into a DC bus electric energy by the AC/DC conversion unit 24. The DC/DC conversion unit 25 is electrically connected between the DC bus 23 and the output terminal of the power conversion module 2. The DC bus electric energy from the AC/DC conversion unit 24 is converted into a DC output electric energy by the DC/DC conversion unit 25. The DC output electric energy is provided to the load L through the output terminal 22. The DC output electric energy includes an output voltage Vo. In this embodiment, the output voltage is a rated value, a set value or a stabilized value of the output voltage. In this embodiment, the DC/DC conversion unit 25 at least includes a transformer 251. The other components of the DC/DC conversion unit 25 and their connection relationships will be illustrated later.

The control unit 3 is electrically connected with the input power source S and N power conversion modules 2 to detect the AC input electric energy from the input power source S. According to the AC input electric energy, the output voltage of each power conversion module 2 and the transformation ratio of the transformer 251 of each power conversion module 2, the control unit 3 acquires N reference voltages. The N reference voltages are sequentially distributed to the N power conversion modules 2. Each reference voltage is used as a reference value of the DC bus voltage in the corresponding power conversion module 2.

According to the reference voltage, an operating mode of the DC/DC conversion unit 25 in the corresponding power conversion module 2 is controlled by the control unit 3. Consequently, the DC/DC conversion unit 25 in the corresponding power conversion module 2 is selectively operated in a bypass mode, a boost mode or a hold mode. Especially, the DC/DC conversion units 25 in the N power conversion modules 2 are operated in the bypass mode, the boost mode and the hold mode according to the corresponding reference voltages. The input voltages Vb1, Vb2, . . . . VbN received by the input terminals 21 of the N power conversion modules 2 are controlled to have segmented voltage waveforms. Consequently, the function of distributing power in a non-uniform manner can be achieved.

As mentioned above, the control unit 3 continuously receives the information about the reference voltages corresponding to the DC/DC conversion units 25 in the N power conversion modules 2. Furthermore, the operating mode of each DC/DC conversion unit 25 is controlled according to the corresponding reference voltage. For example, if the reference voltage corresponding to a specified power conversion module 2 is equal to a first threshold value, the DC/DC conversion unit 25 in the specified power conversion module 2 is operated in the hold mode under control of the control unit 3. Moreover, if the reference voltage corresponding to the specified power conversion module 2 is lower than the first threshold value and greater than a second threshold value, the DC/DC conversion unit 25 in the specified power conversion module 2 is operated in the boost mode under control of the control unit 3. Moreover, if the reference voltage corresponding to the specified power conversion module 2 is lower than or equal to the second threshold value, the DC/DC conversion unit 25 in the specified power conversion module 2 is operated in the bypass mode under control of the control unit 3.

For example, the first threshold value corresponding to the i-th power conversion module 2 is set as $n_i V_{oi}$, wherein $n_i$ is a transformation ratio of the transformer 251 of the DC/DC conversion unit 25 in the i-th power conversion module 2, $V_{oi}$ is the output voltage of the i-th power conversion module 2, and i is a positive integer smaller than or equal to N. The second threshold value is zero or a positive voltage close to zero. The second threshold values corresponding to the N power conversion modules 2 may be identical or different.

Figure 3A:
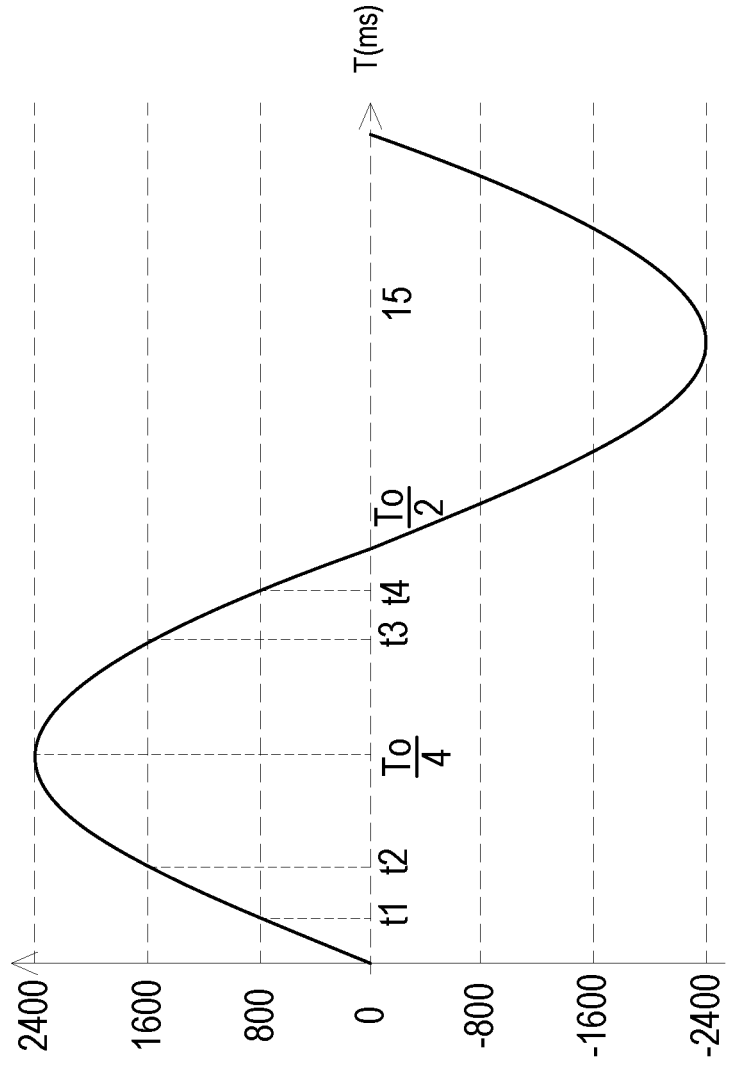
FIG. 3A is a schematic waveform diagram illustrating the input voltage of the AC input electric energy received by the cascaded power conversion system as shown in FIG. 2A.
Figure 3B:
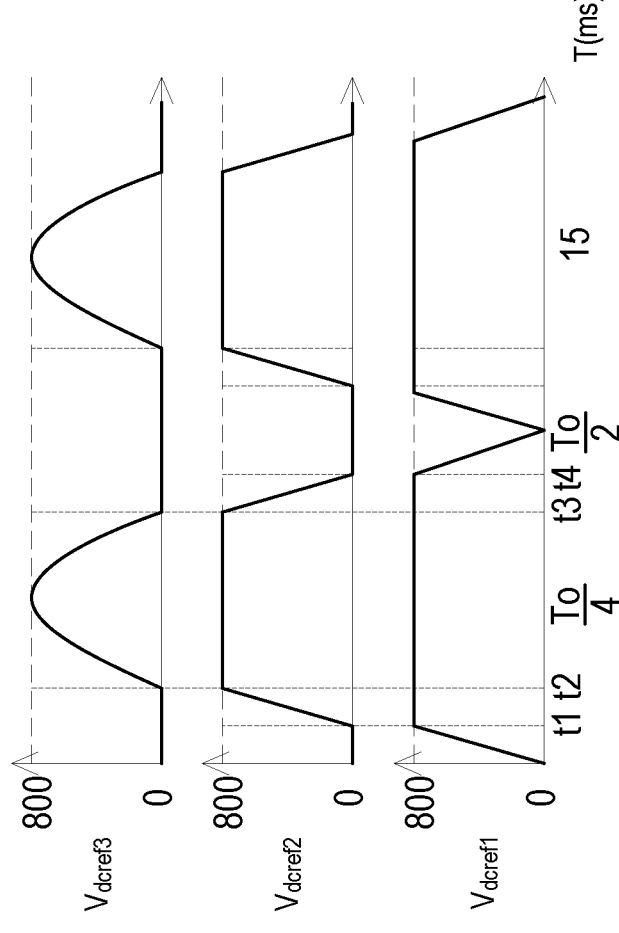
FIG. 3B is a schematic waveform diagram illustrating the reference voltages corresponding to the three power conversion modules of the cascaded power conversion system as shown in FIG. 2A.

Hereinafter, a method of controlling the operating mode of the DC/DC conversion unit 25 according to the reference voltage will be illustrated with reference to FIGS. 3A and 3B. FIG. 3A is a schematic waveform diagram illustrating the input voltage of the AC input electric energy received by the cascaded power conversion system as shown in FIG. 2A. FIG. 3B is a schematic waveform diagram illustrating the reference voltages corresponding to the three power conversion modules of the cascaded power conversion system as shown in FIG. 2A.

In FIG. 3A, the AC input voltage of the AC input electric energy received by the cascaded power conversion system 1 has a period To, the period To is 20 ms, the amplitude of the AC input voltage is 2400V, and the frequency of the AC input voltage is 50 Hz. Moreover, the cascaded power conversion system 1 includes three power conversion modules 2, i.e., a first power conversion module 2, a second power conversion module 2 and a third power conversion module 2.

In FIG. 3B, the waveform of the reference voltage $V_{dcref3}$ corresponding to the third power conversion module 2, the waveform of the reference voltage $V_{dcref2}$ corresponding to the second power conversion module 2 and the waveform of the reference voltage $V_{dcref1}$ corresponding to the first power conversion module 2 are respectively shown from top to bottom.

In this embodiment, the output voltages Vo of the three power conversion modules 2 are equal (e.g., equal to 800V), and the transformation ratios of the transformers 251 of the DC/DC conversion units 25 in the three power conversion modules 2 are equal (e.g., equal to 1). Consequently, the first threshold value corresponding to each power conversion module 2 is 800V. In addition, the second threshold value corresponding to each power conversion module 2 is 0V.

The operating modes of the DC/DC conversion units 25 and the DC bus voltages of the three power conversion modules 2 within one half of period of the AC input voltage (i.e., To/2) will be illustrated as follows. The operating modes of the DC/DC conversion units 25 and the DC bus voltages of the three power conversion modules 2 within the other half of period are similar.

In the following embodiment, the output voltages from the first power conversion module 2, the second power conversion module 2 and the third power conversion module 2 are equal (e.g., equal to Vo), and the transformations ratios of the transformers 251 of the DC/DC conversion units 25 in the three power conversion modules 2 are equal (e.g., equal to n). The amplitude of the input voltage Vin is divided into three segments. The voltage value of each segment of the input voltage Vin is equal to nVo. The amplitude of each reference voltage is set as the first threshold value (e.g., 800V).

In the time interval between 0 and t1, the voltage of the AC input electric energy rises from 0V to 800V. The reference voltage corresponding to the first power conversion module 2 rises from 0V to 800V. Meanwhile, the control unit 3 determines that the reference voltage corresponding to the first power conversion module 2 is lower than the first threshold value (e.g., 800V) and greater than the second threshold value (e.g., 0V). Under control of the control unit 3, the DC/DC conversion unit 25 in the first power conversion module 2 is operated in the boost mode. Since the DC/DC conversion unit 25 in the first power conversion module 2 is operated in the boost mode, the DC bus voltage received by the DC/DC conversion unit 25 in the first power conversion module 2 rises from 0V to 800V according to the change of the reference voltage. In this time interval, the AC/DC conversion unit 24 in the first power conversion module 2 is operated in a power frequency rectification mode. Consequently, the input voltage received by the input terminal of the first power conversion module 2 rises from 0V to 800V according to the change of the DC bus voltage.

In this time interval, the reference voltage corresponding to the second power conversion module 2 is 0V, and the reference voltage corresponding to the third power conversion module 2 is 0V. Meanwhile, the control unit 3 determines that the reference voltage corresponding to the second power conversion module 2 and the reference voltage corresponding to the third power conversion module 2 are both equal to the second threshold value (e.g., 0V). Under control of the control unit 3, the DC/DC conversion unit 25 in the second power conversion module 2 and the DC/DC conversion unit 25 in the third power conversion module 2 are operated in the bypass mode. Since the DC/DC conversion unit 25 in the second power conversion module 2 and the DC/DC conversion unit 25 in the third power conversion module 2 are operated in the bypass mode, the DC bus voltage received by the DC/DC conversion unit 25 in the second power conversion module 2 and the DC bus voltage received by the DC/DC conversion unit 25 in the third power conversion module 2 are 0V according to the change of the reference voltage. In this time interval, the AC/DC conversion unit 24 in the second power conversion module 2 and the AC/DC conversion unit 24 in the third power conversion module 2 are operated in the bypass mode. Consequently, the input voltage received by the input terminal of the second power conversion module 2 and the input voltage received by the input terminal of the third power conversion module 2 are 0V according to the change of the DC bus voltage.

Obviously, in the time interval between 0 and t1, the entire of the power provided by the AC input electric energy is distributed to the first power conversion module 2. In addition, the input power provided to the second power conversion module 2 and the input power provided to the third power conversion module 2 are zero.

In the time interval between t1 and t2, the voltage of the AC input electric energy rises from 800V to 1600V. The reference voltage corresponding to the first power conversion module 2 is maintained at 800V. Meanwhile, the control unit 3 determines that the reference voltage corresponding to the first power conversion module 2 is equal to the first threshold value (e.g., 800V). Under control of the control unit 3, the DC/DC conversion unit 25 in the first power conversion module 2 is operated in the hold mode. Since the DC/DC conversion unit 25 in the first power conversion module 2 is operated in the hold mode, the DC bus voltage received by the DC/DC conversion unit 25 in the first power conversion module 2 is maintained at 800V according to the change of the reference voltage. In this time interval, the AC/DC conversion unit 24 in the first power conversion module 2 is operated in a power frequency rectification mode. Consequently, the input voltage received by the input terminal 21 of the first power conversion module 2 is maintained at 800V according to the change of the DC bus voltage.

In this time interval, the reference voltage corresponding to the second power conversion module 2 rises from 0V to 800V. Meanwhile, the control unit 3 determines that the reference voltage corresponding to the second power conversion module 2 is lower than the first threshold value (e.g., 800V) and greater than the second threshold value (e.g., 0V). Under control of the control unit 3, the DC/DC conversion unit 25 in the second power conversion module 2 is operated in the boost mode. Since the DC/DC conversion unit 25 in the second power conversion module 2 is operated in the boost mode, the DC bus voltage received by the DC/DC conversion unit 25 in the second power conversion module 2 rises from 0V to 800V according to the change of the reference voltage. In this time interval, the AC/DC conversion unit 24 in the second power conversion module 2 is operated in the power frequency rectification mode. Consequently, the input voltage received by the input terminal 21 of the second power conversion module 2 rises from 0V to 800V according to the change of the DC bus voltage.

In this time interval, the reference voltage corresponding to the third power conversion module 2 is 0V. Meanwhile, the control unit 3 determines that the reference voltage corresponding to the third power conversion module 2 is equal to the second threshold value (e.g., 0V). Under control of the control unit 3, the DC/DC conversion unit 25 in the third power conversion module 2 is operated in the bypass mode. Since the DC/DC conversion unit 25 in the third power conversion module 2 is operated in the bypass mode, the DC bus voltage received by the DC/DC conversion unit 25 in the third power conversion module 2 is 0V according to the change of the reference voltage. In this time interval, the AC/DC conversion unit 24 in the third power conversion module 2 is operated in the bypass mode. Consequently, the input voltage received by the input terminal 21 of the third power conversion module 2 is 0V according to the change of the DC bus voltage.

Obviously, in the time interval between t1 and t2, the power provided by the AC input electric energy is distributed to the first power conversion module 2 and the second power conversion module 2. In addition, the power provided to the first power conversion module 2 and the power provided to the second power conversion module 2 are not equal. As the AC input voltage gradually rises, the number of the power conversion modules into work is gradually increased.

In the time interval between t2 and t3, the voltage of the AC input electric energy rises from 1600V to 2400V and then drops to 1600V. The reference voltage corresponding to the first power conversion module 2 and the reference voltage corresponding to the second power conversion module 2 are maintained at 800V. Meanwhile, the control unit 3 determines that the reference voltage corresponding to the first power conversion module 2 and the reference voltage corresponding to the second power conversion module 2 are equal to the first threshold value (e.g., 800V). Under control of the control unit 3, the DC/DC conversion unit 25 in the first power conversion module 2 and the DC/DC conversion unit 25 in the second power conversion module 2 are operated in the hold mode. Since the DC/DC conversion unit 25 in the first power conversion module 2 and the DC/DC conversion unit 25 in the second power conversion module 2 are operated in the hold mode, the DC bus voltage received by the DC/DC conversion unit 25 in the first power conversion module 2 and the DC bus voltage received by the DC/DC conversion unit 25 in the second power conversion module 2 are maintained at 800V according to the changes of the reference voltages. In this time interval, the AC/DC conversion unit 24 in the first power conversion module 2 and the AC/DC conversion unit 24 in the second power conversion module 2 are operated in the power frequency rectification mode. Consequently, the input voltage received by the input terminal 21 of the first power conversion module 2 and the input voltage received by the input terminal 21 of the second power conversion module 2 are maintained at 800V according to the change of the DC bus voltage.

In this time interval, the reference voltage corresponding to the third power conversion module 2 rises from 0V to 800V and then drops to 0V. Meanwhile, the control unit 3 determines that the reference voltage corresponding to the third power conversion module 2 is lower than the first threshold value (e.g., 800V) and greater than the second threshold value (e.g., 0V). Under control of the control unit 3, the DC/DC conversion unit 25 in the third power conversion module 2 is operated in the boost mode. Since the DC/DC conversion unit 25 in the third power conversion module 2 is operated in the boost mode, the DC bus voltage received by the DC/DC conversion unit 25 in the third power conversion module 2 rises from 0V to 800V and then drops to 0V according to the changes of the reference voltages. In this time interval, the AC/DC conversion unit 24 in the third power conversion module 2 is operated in the power frequency rectification mode. Consequently, the input voltage received by the input terminal 21 of the third power conversion module 2 rises from 0V to 800V and then drops to 0V according to the changes of the DC bus voltage.

Obviously, in the time interval between t2 and t3, the power provided by the AC input electric energy is distributed to the three power conversion modules 2. The power provided to the first power conversion module 2 and the power provided to the second power conversion module 2 are equal. However, the power provided to the third power conversion module 2 is not equal to the power provided to the first power conversion module 2 (or the second power conversion module 2).

In the time interval between the time t3 and t4, the voltage of the AC input electric energy drops from 1600V to 800V. The reference voltage corresponding to the first power conversion module 2 is maintained at 800V. Meanwhile, the control unit 3 determines that the reference voltage corresponding to the first power conversion module 2 is equal to the first threshold value (e.g., 800V). Under control of the control unit 3, the DC/DC conversion unit 25 in the first power conversion module 2 is operated in the hold mode. Since the DC/DC conversion unit 25 in the first power conversion module 2 is operated in the hold mode, the DC bus voltage received by the DC/DC conversion unit 25 in the first power conversion module 2 is maintained at 800V according to the change of the reference voltage. In this time interval, the AC/DC conversion unit 24 in the first power conversion module 2 is operated in the power frequency rectification mode. Consequently, the input voltage received by the input terminal 21 of the first power conversion module 2 is maintained at 800V according to the change of the DC bus voltage.

In this time interval, the reference voltage corresponding to the second power conversion module 2 drops from 800V to 0V. Meanwhile, the control unit 3 determines that the reference voltage corresponding to the second power conversion module 2 is lower than the first threshold value (e.g., 800V) and greater than the second threshold value (e.g., 0V). Under control of the control unit 3, the DC/DC conversion unit 25 in the second power conversion module 2 is operated in the boost mode. Since the DC/DC conversion unit 25 in the second power conversion module 2 is operated in the boost mode, the DC bus voltage received by the DC/DC conversion unit 25 in the second power conversion module 2 drops from 800V to 0V according to the changes of the reference voltages. In this time interval, the AC/DC conversion unit 24 in the second power conversion module 2 is operated in the power frequency rectification mode. Consequently, the input voltage received by the input terminal 21 of the second power conversion module 2 drops from 800V to 0V according to the change of the DC bus voltage.

In this time interval, the reference voltage corresponding to the third power conversion module 2 is 0V. Meanwhile, the control unit 3 determines that the reference voltage corresponding to the third power conversion module 2 is equal to the second threshold value (e.g., 0V). Under control of the control unit 3, the DC/DC conversion unit 25 in the third power conversion module 2 is operated in the bypass mode. Since the DC/DC conversion unit 25 in the third power conversion module 2 is operated in the bypass mode, the DC bus voltage received by the DC/DC conversion unit 25 in the third power conversion module 2 is 0V according to the change of the reference voltage. In this time interval, the AC/DC conversion unit 24 in the third power conversion module 2 is operated in the bypass mode. Consequently, the input voltage received by the input terminal 21 of the third power conversion module 2 is 0V according to the change of the DC bus voltage.

Obviously, in the time interval between t3 and t4, the power provided by the AC input electric energy is distributed to the first power conversion module 2 and the second power conversion module 2. In addition, the power provided to the first power conversion module 2 and the power provided to the second power conversion module 2 are not equal.

In the time interval between t4 and To/2, the voltage of the AC input electric energy drops from 800V to 0V. The reference voltage corresponding to the first power conversion module 2 drops from 800V to 0V. Meanwhile, the control unit 3 determines that the reference voltage corresponding to the first power conversion module 2 is lower than the first threshold value (e.g., 800V) and greater than the second threshold value (e.g., 0V). Under control of the control unit 3, the DC/DC conversion unit 25 in the first power conversion module 2 is operated in the boost mode. Since the DC/DC conversion unit 25 in the first power conversion module 2 is operated in the boost mode, the DC bus voltage received by the DC/DC conversion unit 25 in the first power conversion module 2 drops from 800V to 0V according to the change of the reference voltage. In this time interval, the AC/DC conversion unit 24 in the first power conversion module 2 is operated in the power frequency rectification mode. Consequently, the input voltage received by the input terminal 21 of the first power conversion module 2 drops from 800V to 0V according to the change of the DC bus voltage.

In this time interval, the reference voltage corresponding to the second power conversion module 2 and the reference voltage corresponding to the third power conversion module 2 are 0V. Meanwhile, the control unit 3 determines that the reference voltage corresponding to the second power conversion module 2 and the reference voltage corresponding to the third power conversion module 2 are equal to the second threshold value (e.g., 0V). Under control of the control unit 3, the DC/DC conversion unit 25 in the second power conversion module 2 and the DC/DC conversion unit 25 in the third power conversion module 2 are operated in the bypass mode. Since the DC/DC conversion unit 25 in the second power conversion module 2 and the DC/DC conversion unit 25 in the third power conversion module 2 are operated in the bypass mode, the DC bus voltage received by the DC/DC conversion unit 25 in the second power conversion unit 25 and the DC bus voltage received by the DC/DC conversion unit 25 in the third power conversion module 2 are 0V according to the changes of the reference voltages. In this time interval, the AC/DC conversion unit 24 in the second power conversion module 2 and the AC/DC conversion unit 24 in the third power conversion module 2 are operated in the bypass mode. Consequently, the input voltage received by the input terminal 21 of the second power conversion module 2 and the input terminal 21 of the third power conversion module 2 are 0V according to the changes of the DC bus voltage.

Obviously, in the time interval between t4 and To/2, the entire of the power provided by the AC input electric energy is distributed to the first power conversion module 2. In addition, the input power provided to the second power conversion module 2 and the input power provided to the third power conversion module 2 are zero.

Figure 4A:
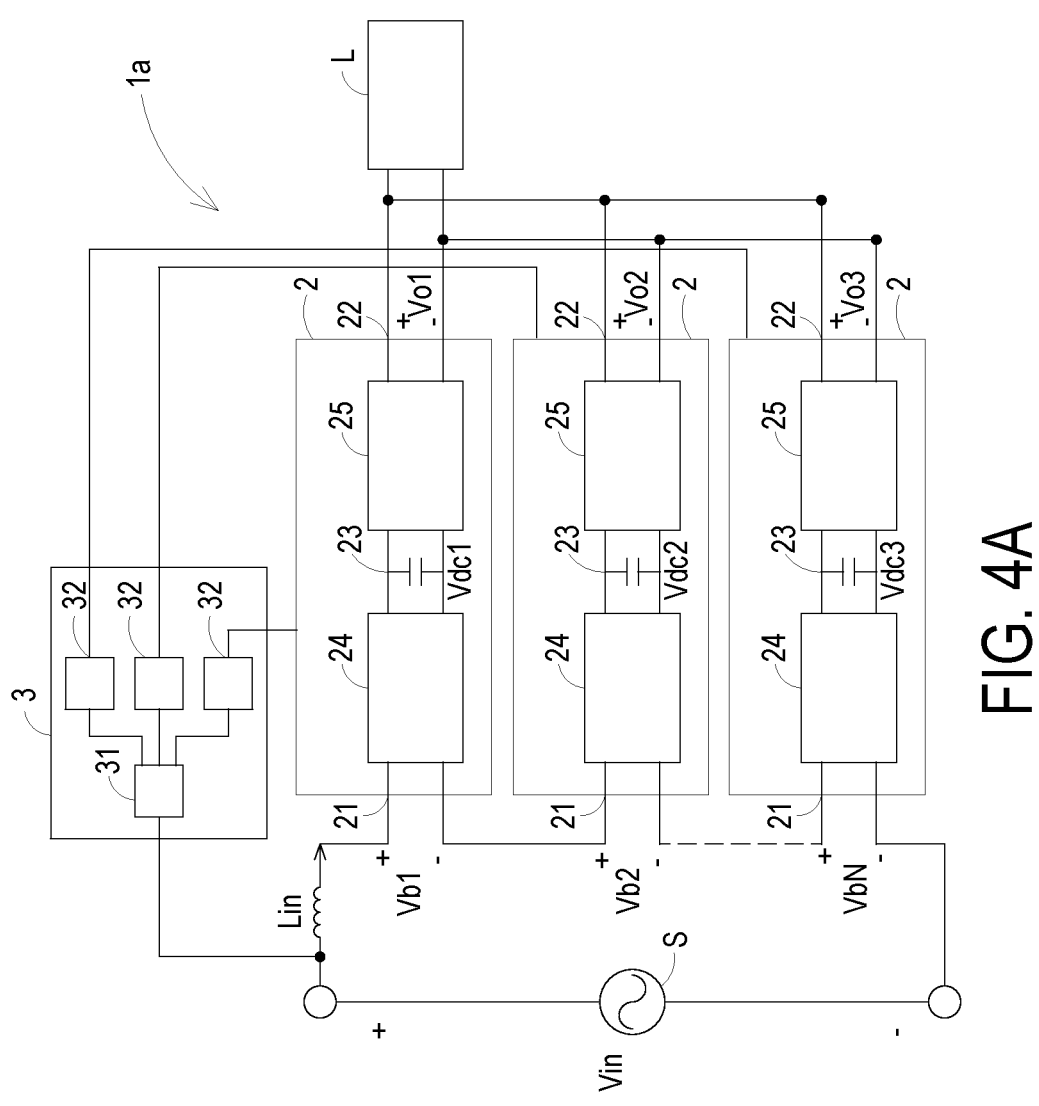
FIG. 4A is a schematic circuit diagram illustrating a cascaded power conversion system according to a second embodiment of the present disclosure.

In an embodiment, the control unit 3 has a master-slave control mechanism. FIG. 4A is a schematic circuit diagram illustrating a cascaded power conversion system according to a second embodiment of the present disclosure. In this embodiment, the control unit 3 of the cascaded power conversion system 1a includes a master controller 31 and N slave controllers 32 (e.g., three slave controllers). The first terminal of the master controller 31 is electrically connected with the input power source S. The second terminals of the master controller 31 are electrically connected with the first terminals of the N slave controllers 32. The second terminal of each slave controller 32 is electrically connected with the corresponding power conversion module 2.

The master controller 31 receives the AC input voltage Vin from the input power source S. In addition, after the AC input voltage Vin is rectified at the power frequency, the rectified voltage Vm is acquired by the master controller 31. According to the voltages $n_i$Voi, the rectified voltage Vm is divided into N segments, wherein i=1, 2, 3, . . . , N. Consequently, N reference voltages $V_{dcref1}$, $V_{dcref2}$, . . . , and $V_{dcrefN}$ are obtained. These N reference voltages are respectively inputted into the N slave controllers 32. The amplitude of the i-th reference voltage $V_{dcref1}$ is equal to $n_i$Voi.

In an embodiment, each slave controller 32 controls the operating mode of the DC/DC conversion unit 25 in the corresponding power conversion module 2 according to the reference voltage. Consequently, the DC/DC conversion unit 25 in the corresponding power conversion module 2 is selectively operated in the bypass mode, the boost mode or the hold mode. In another embodiment, the master controller 31 generates N control instructions according to the N reference voltages, the first threshold value and the second threshold value. The N control instructions are respectively transmitted to the N slave controllers 32, to indicate the operating modes of the DC/DC conversion units 25 in the N power conversion modules 2. According to the control instruction, the DC/DC conversion unit 25 in the corresponding power conversion module 2 is selectively operated in the bypass mode, the boost mode or the hold mode under control of the corresponding slave controller 32.

The AC/DC conversion unit 24 in each power conversion module 2 is selectively operated in the bypass mode or the power frequency rectification mode. The control method is very simple. The DC bus voltage received by the DC/DC conversion unit 25 and the output voltage outputted from the DC/DC conversion unit 25 are controlled by the corresponding slave controller 32. Consequently, the input voltage and the input current received by the input terminal 21 of the power conversion module 2 are correspondingly controlled. That is, the input power of each power conversion module 2 is controlled. Preferably but not exclusively, the output voltage is controlled according to a voltage-current closed-loop control mechanism, and the DC bus voltage is controlled according to a frequency modulation technology or a secondary phase shift technology.

In another embodiment, the control unit 3 has a centralized control mechanism. The circuitry topology of the cascaded power conversion system using the centralized control mechanism of the control unit 3 can be seen in FIG. 2A. The first terminal of the control unit 3 is electrically connected with the input power source S. The second terminals of the control unit 3 are electrically connected with the N power conversion modules 2.

The control unit 3 receives the AC input voltage Vin from the input power source S. In addition, after the AC input voltage Vin is rectified at the power frequency, the rectified voltage Vm is acquired by the control unit 3. According to the voltages $n_iVoi$, the rectified voltage Vm is divided into N segments, wherein i=1, 2, 3, . . . , N. Consequently, N reference voltages $V_{dcref1}$, $V_{dcref2}$, . . . , and $V_{dcrefl}$ are obtained. The amplitude of the i-th reference voltage $V_{dcref1}$ is equal to $n_iVoi$. According to the N reference voltages, the DC/DC conversion unit 25 in the corresponding power conversion module 2 is selectively operated in the bypass mode, the boost mode or the hold mode. The control method is similar to that of the first embodiment, and not redundantly described herein.

Figure 4B:
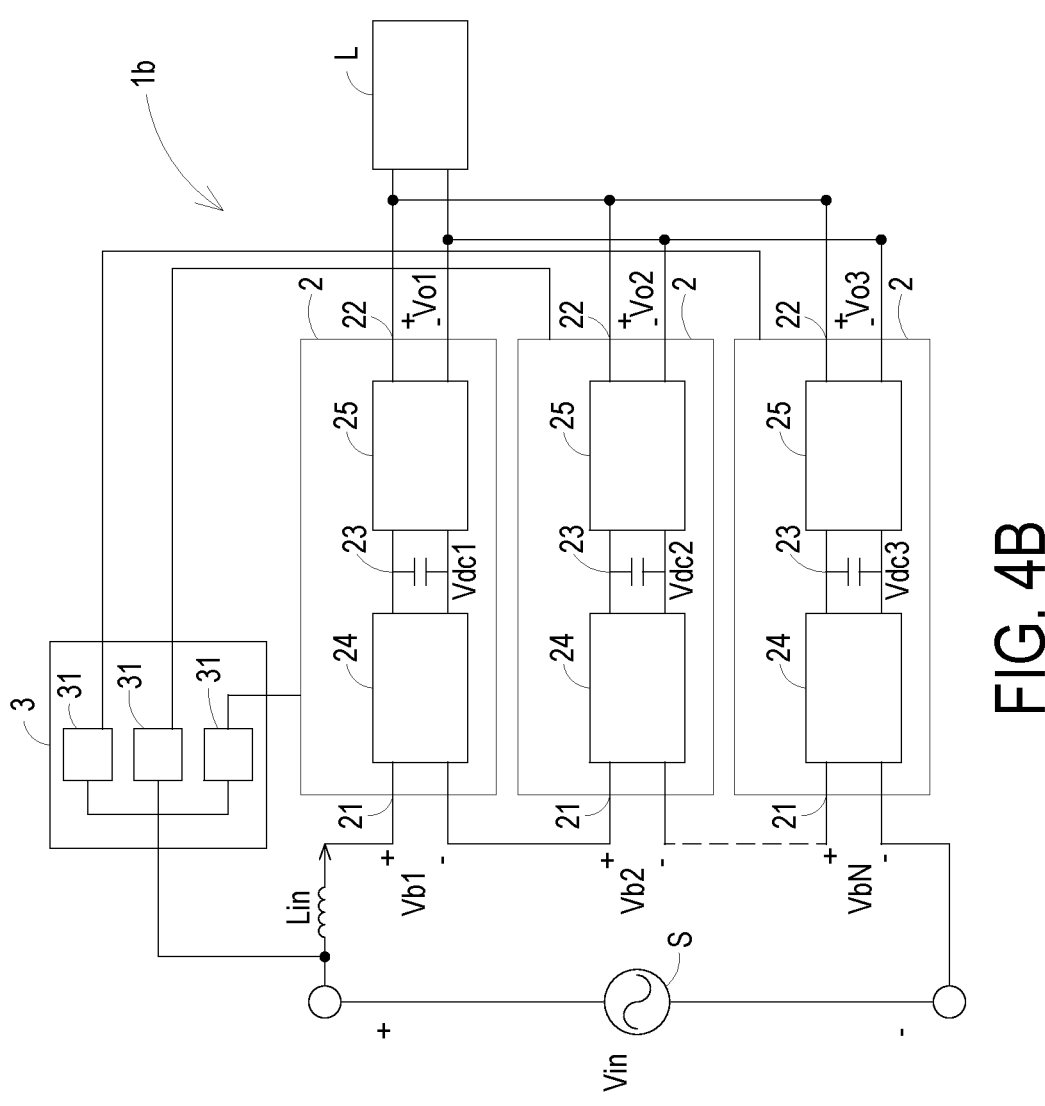
FIG. 4B is a schematic circuit diagram illustrating a cascaded power conversion system according to a third embodiment of the present disclosure.

In another embodiment, the control unit 3 has a distributed control mechanism. FIG. 4B is a schematic circuit diagram illustrating a cascaded power conversion system according to a third embodiment of the present disclosure. In this embodiment, the control unit 3 of the cascaded power conversion system 1b includes N controllers 31 (e.g., three controllers). The first terminal of each controller 31 is electrically connected with the input power source S. The second terminal of each controller 31 is electrically connected with the corresponding power conversion module 2.

Each controller 31 is configured to receive the AC input voltage Vin from the input power source S. In addition, after the AC input voltage Vin is rectified at the power frequency, the rectified voltage Vm is acquired by the controller 31. According to the voltages $n_iVoi$, the rectified voltage Vm is divided into N segments, wherein i=1, 2, 3, . . . , N. Consequently, N reference voltages $V_{dcref1}$, $V_{dcref2}$, . . . , and $V_{dcrefN}$ are obtained. Each controller 31 is further configured to determine one reference voltage from the N reference voltages. The amplitude of the i-th reference voltage $V_{dcref1}$ is equal to $n_iVoi$. The reference voltage determined is a reference value of the DC bus voltage of the corresponding power conversion module 2. According to the reference voltage determined, the DC/DC conversion unit 25 in the corresponding power conversion module 2 is selectively operated in the bypass mode, the boost mode or the hold mode. The control method is similar to that of the first embodiment, and not redundantly described herein.

For example, the control unit 3 includes an analog circuit, a microprocessor, a digital signal processor (DSP), an application specific integrated circuit (ASIC) and/or a field programmable gate array (FPGA).

In accordance with the control method of the present disclosure, the operation modes of the DC/DC conversion units 25 in the N power conversion modules 2 include the bypass mode, the boost mode and the hold mode within the ½ period (or ¼ period) of the voltage of the AC input electric energy. The total voltage of the DC bus voltages of the N power conversion modules 2 are changed in a consecutive manner. In addition, the total voltage of the DC bus voltages of the N power conversion modules 2 is equal to the voltage of the AC input electric energy at any time point of the ½ period. For example, the cascaded power conversion system 1 includes three power conversion modules 2. As shown in FIG. 3A, the superposed waveform of the DC bus voltages of the three power conversion modules 2 is identical to the waveform of the voltage of the AC input electric energy within the previous ½ period. That is, the total voltage of the DC bus voltages of the three power conversion modules 2 is equal to the voltage of the AC input electric energy. In the next ½ period, the voltage of the AC input electric energy is negative. The superposed waveform of the DC bus voltages of the three power conversion modules 2 is complementary to the waveform of the voltage of the AC input electric energy. However, the total voltage of the DC bus voltages of the three power conversion modules 2 is equal to the absolute of the voltage of the AC input electric energy. That is, the superposed waveform of the DC bus voltages of the three power conversion modules 2 is identical to the waveform of the rectified voltage of the AC input electric energy at the low frequency.

As mentioned above, the DC/DC conversion units 25 in the N power conversion modules 2 are operated in the bypass mode, the boost mode and the hold mode. When the DC/DC conversion unit 25 is operated in the bypass mode or the boost mode, the switching loss of the DC/DC conversion unit 25 is low, and the loss of the transformer 251 in the DC/DC conversion unit 25 is low. When the DC/DC conversion unit 25 is operated in the hold mode or the bypass mode, the on-state loss of the DC/DC conversion unit 25 is low. Moreover, when the AC/DC conversion unit 24 of the power conversion module 2 receives the AC input electric energy, the DC output electric energy is immediately outputted from the DC/DC conversion unit 25. Since it is not necessary to store electric energy in the bus capacitor of the DC bus 23 of the power conversion module 2, the bus capacitor with a low capacitance value and a small volume is feasible. As a consequence, the cost of the cascaded power conversion system 1 is reduced.

When the DC/DC conversion unit 25 in a specified power conversion module 2 is operated in the bypass mode, the AC/DC conversion unit 24 in the specified power conversion module 2 is also operated in the bypass mode. When the DC/DC conversion unit 25 in a specified power conversion module 2 is operated in the boost mode or the hold mode, the AC/DC conversion unit 24 in the specified power conversion module 2 is operated in the low frequency rectification mode. The AC/DC conversion unit 24 (i.e., the front-stage conversion circuit) is selectively operated in the low frequency rectification mode or the bypass mode. During the operation of the AC/DC conversion unit 24, it is not necessary to control the voltage and the current received by the input terminal 21. Consequently, the switching loss in the front stage is reduced. In an example of FIG. 2B, the AC/DC conversion unit 24 is a diode rectifier circuit without a driving circuit. Moreover, the DC/DC conversion unit 25 (i.e., the rear-stage conversion circuit) is selectively operated in the bypass mode, the boost mode or the hold mode under control of the control unit 3. Since the input voltages received by the input terminals 21 of the N power conversion modules 2 are controlled to have segmented voltage waveforms, total voltage of the DC bus voltages of the N power conversion modules 2 are changed in a consecutive manner.

In an embodiment, the operating mode of the DC/DC conversion unit 25 in the power conversion module 2 is controlled according to the input power of the power conversion module 2. For example, in case that the input power of a specified power conversion module 2 is subjected to a change, the DC/DC conversion unit 25 in the specified power conversion module 2 is operated in the boost mode under control of the control unit 3. In case that the input power of a specified power conversion module 2 is not changed, the DC/DC conversion unit 25 in the specified power conversion module 2 is operated in the hold mode under control of the control unit 3. In case that the input power of a specified power conversion module 2 is zero, the DC/DC conversion unit 25 in the specified power conversion module 2 is operated in the bypass mode under control of the control unit 3. In accordance with the feature of the present disclosure, the input power levels of the N power conversion modules 2 are rationally distributed. Consequently, the DC/DC conversion units 25 of the N power conversion modules 2 are operated in at least two operating modes. Consequently, the switching loss and the on-state loss of the rear-stage DC/DC conversion units 25 are reduced, and the power loss of the transformer 251 in the DC/DC conversion units 25 is reduced. Consequently, the systematic efficiency is enhanced.

Please refer to FIGS. 2B and 3B again. In an embodiment, the DC/DC conversion unit 25 is an LLC resonant converter. The input voltages received by the input terminals 21 of the N power conversion modules 2 are controlled to have segmented voltage waveforms. Consequently, the function of distributing power in a non-uniform manner can be achieved. The amplitude of the voltage of each segment is determined according to the resonant cavity output voltage ($n_iVoi$) of the DC/DC conversion unit 25 in the hold mode. For example, the amplitude of the voltage of each segment is 800V. The voltage of each segment is not restricted as long as the function of distributing power in the non-uniform manner is achievable. Moreover, the superposed waveform of the segmented voltages is changed in a consecutive manner, and the superposed waveform of the segmented voltages is identical or complementary to the waveform of the voltage of the AC input electric energy.

In addition, the total voltage of the DC bus voltages of the N power conversion modules 2 is equal to the voltage of the AC input electric energy at any time point of the ½ period.

In the embodiment of FIG. 3B, the output voltages from the three power conversion modules 2 are equal, and the transformation ratios of the DC/DC conversion units 25 in the three power conversion modules 2 are equal. Consequently, the amplitudes of the voltages of the three segments are equal. That is, the amplitudes of the three reference voltages corresponding to the three power conversion modules 2 are equal.

Figure 5A:
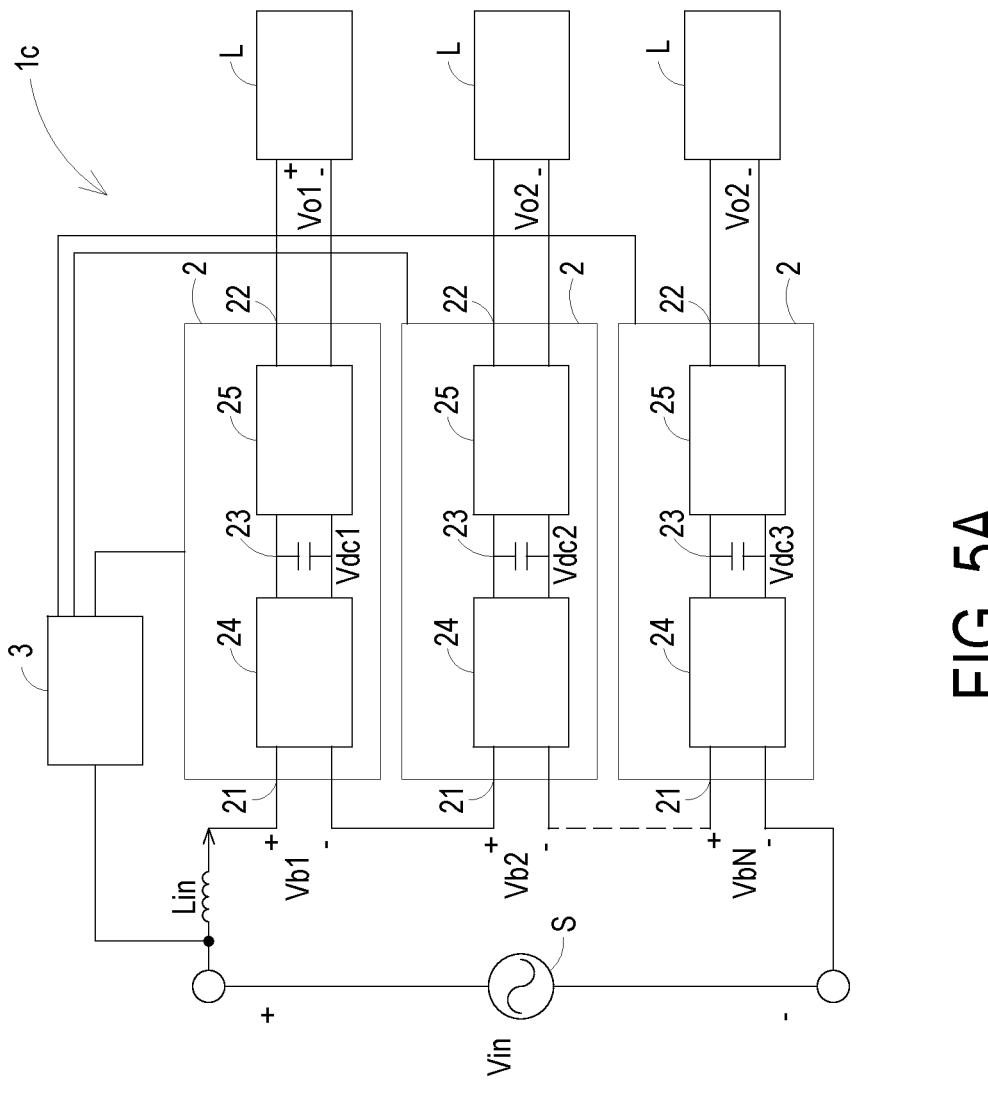
FIG. 5A is a schematic circuit diagram illustrating a cascaded power conversion system according to a fourth embodiment of the present disclosure.
Figure 5B:
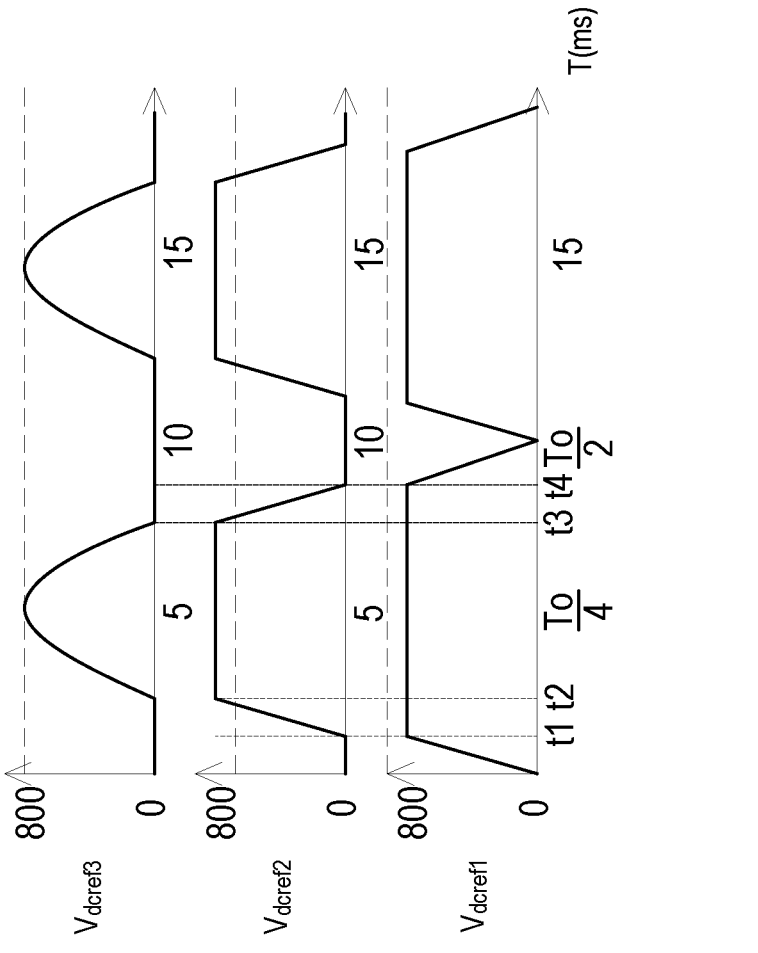
FIG. 5B is a schematic waveform diagram illustrating the reference voltages corresponding to the three power conversion modules of the cascaded power conversion system as shown in FIG. 5A.

In some embodiments, the amplitudes of the three reference voltages corresponding to the three power conversion modules 2 are different. Please refer to FIGS. 5A and 5B. FIG. 5A is a schematic circuit diagram illustrating a cascaded power conversion system according to a fourth embodiment of the present disclosure. FIG. 5B is a schematic waveform diagram illustrating the reference voltages corresponding to the three power conversion modules of the cascaded power conversion system as shown in FIG. 5A. In the cascaded power conversion system 1 of FIG. 2A, the output terminals 22 of the N power conversion modules 2 are connected with each other in parallel. However, in the cascaded power conversion system 1c of this embodiment, the output terminals 22 of the N power conversion modules 2 are not connected with each other. However, the output terminals 22 of the N power conversion modules 2 are respectively connected with the corresponding loads L.

In FIG. 5B, the waveform of the reference voltage $V_{dcref3}$ corresponding to the third power conversion module 2, the waveform of the reference voltage $V_{dcref2}$ corresponding to the second power conversion module 2 and the waveform of the reference voltage $V_{dcref1}$ corresponding to the first power conversion module 2 are respectively shown from top to bottom.

In this embodiment, the amplitudes of the three reference voltages corresponding to the three power conversion modules 2 are different. A method of controlling the operating mode of the DC/DC conversion unit 25 according to the reference voltage will be illustrated as follows. In FIG. 5B, the AC input voltage Vin of the AC input electric energy received by the cascaded power conversion system 1c has a period To, the first threshold value of the first power conversion module 2 is $n_1Vo1$, the first threshold value of the second power conversion module 2 is $n_2Vo2$, and the first threshold value of the third power conversion module 2 is $n_3Vo3$. In addition, the second threshold values of the three power conversion modules 2 are equal (e.g., equal to zero).

In the time interval between 0 and t1, the voltage of the AC input electric energy rises from 0V to $n_1Vo1$ (e.g., 600V). The reference voltage corresponding to the first power conversion module 2 rises from 0V to $n_1Vo1$. Meanwhile, the control unit 3 determines that the reference voltage corresponding to the first power conversion module 2 is lower than the first threshold value of the first power conversion module 2 and greater than the second threshold value. Under control of the control unit 3, the DC/DC conversion unit 25 in the first power conversion module 2 is operated in the boost mode. Since the DC/DC conversion unit 25 in the first power conversion module 2 is operated in the boost mode, the DC bus voltage received by the DC/DC conversion unit 25 in the first power conversion module 2 rises from 0V to $n_1Vo1$ according to the change of the reference voltage. In this time interval, the AC/DC conversion unit 24 in the first power conversion module 2 is operated in a power frequency rectification mode. Consequently, the input voltage received by the input terminal 21 of the first power conversion module 2 rises from 0V to $n_1Vo1$ according to the change of the DC bus voltage.

In this time interval, the reference voltage corresponding to the second power conversion module 2 and the reference voltage corresponding to the third power conversion module 2 are 0V. Meanwhile, the control unit 3 determines that the reference voltage corresponding to the second power conversion module 2 and the reference voltage corresponding to the third power conversion module 2 are both equal to the second threshold value. Under control of the control unit 3, the DC/DC conversion unit 25 in the second power conversion module 2 and the DC/DC conversion unit 25 in the third power conversion module 2 are operated in the bypass mode. Since the DC/DC conversion unit 25 in the second power conversion module 2 and the DC/DC conversion unit 25 in the third power conversion module 2 are operated in the bypass mode, the DC bus voltage received by the DC/DC conversion unit 25 in the second power conversion module 2 and the DC bus voltage received by the DC/DC conversion unit 25 in the third power conversion module 2 are 0V according to the changes of the reference voltages. In this time interval, the AC/DC conversion unit 24 in the second power conversion module 2 and the AC/DC conversion unit 24 in the third power conversion module 2 are operated in the bypass mode. Consequently, the input voltage received by the input terminal 21 of the second power conversion module 2 and the input voltage received by the input terminal 21 of the third power conversion module 2 are 0V according to the changes of the DC bus voltages.

Obviously, in the time interval between 0 and t1, the entire of the power provided by the AC input electric energy is distributed to the first power conversion module 2. In addition, the input power provided to the second power conversion module 2 and the input power provided to the third power conversion module 2 are zero.

In the time interval between t1 and t2, the voltage of the AC input electric energy rises from $n_1Vo1$ (e.g., 600V) to $n_1Vo1+n_2Vo2$ (e.g., 1600V). The reference voltage corresponding to the first power conversion module 2 is maintained at $n_1Vo1$. Meanwhile, the control unit 3 determines that the reference voltage corresponding to the first power conversion module 2 is equal to the first threshold value $n_1Vo1$ of the first power conversion module 2. Under control of the control unit 3, the DC/DC conversion unit 25 in the first power conversion module 2 is operated in the hold mode. Since the DC/DC conversion unit 25 in the first power conversion module 2 is operated in the hold mode, the DC bus voltage received by the DC/DC conversion unit 25 in the first power conversion module 2 is maintained at $n_1Vo1$ according to the change of the reference voltage. In this time interval, the AC/DC conversion unit 24 in the first power conversion module 2 is operated in a power frequency rectification mode. Consequently, the input voltage received by the input terminal 21 of the first power conversion module 2 is maintained at $n_1Vo1$ according to the change of the DC bus voltage.

In this time interval, the reference voltage corresponding to the second power conversion module 2 rises from 0V to $n_2Vo2$ (e.g., 1000V). Meanwhile, the control unit 3 determines that the reference voltage corresponding to the second power conversion module 2 is lower than the first threshold value $n_2Vo2$ of the second power conversion module 2 and greater than the second threshold value. Under control of the control unit 3, the DC/DC conversion unit 25 in the second power conversion module 2 is operated in the boost mode. Since the DC/DC conversion unit 25 in the second power conversion module 2 is operated in the boost mode, the DC bus voltage received by the DC/DC conversion unit 25 in the second power conversion module 2 rises from 0V to $n_2Vo2$ according to the change of the reference voltage. In this time interval, the AC/DC conversion unit 24 in the second power conversion module 2 is operated in the power frequency rectification mode. Consequently, the input voltage received by the input terminal 21 of the second power conversion module 2 rises from 0V to $n_2Vo2$ according to the change of the DC bus voltage.

In this time interval, the reference voltage corresponding to the third power conversion module 2 is 0V. Meanwhile, the control unit 3 determines that the reference voltage corresponding to the third power conversion module 2 is equal to the second threshold value. Under control of the control unit 3, the DC/DC conversion unit 25 in the third power conversion module 2 is operated in the bypass mode. Since the DC/DC conversion unit 25 in the third power conversion module 2 is operated in the bypass mode, the DC bus voltage received by the DC/DC conversion unit 25 in the third power conversion module 2 is 0V according to the change of the reference voltage. In this time interval, the AC/DC conversion unit 24 in the third power conversion module 2 is operated in the bypass mode. Consequently, the input voltage received by the input terminal 21 of the third power conversion module 2 is 0V according to the changes of the DC bus voltage.

Obviously, in the time interval between t1 and t2, the power provided by the AC input electric energy is distributed to the first power conversion module 2 and the second power conversion module 2. In addition, the power provided to the first power conversion module 2 and the power provided to the second power conversion module 2 are not equal. As the AC input voltage gradually rises, the number of the power conversion modules into work is gradually increased.

In the time interval between t2 and t3, the voltage of the AC input electric energy rises from $n_1Vo1+n_2Vo2$ (e.g., 1600V) to $n_1Vo1+n_2Vo2+n_3Vo3$ (e.g., 2400V) and then drops to $n_1Vo1+n_2Vo2$ (e.g., 1600V). The reference voltage corresponding to the first power conversion module 2 is maintained at $n_1Vo1$, and the reference voltage corresponding to the second power conversion module 2 is maintained at $n_2Vo2$. Meanwhile, the control unit 3 determines that the reference voltage corresponding to the first power conversion module 2 is equal to the first threshold value $n_1Vo1$ of the first power conversion module 2 and the reference voltage corresponding to the second power conversion module 2 is equal of the first threshold value $n_2Vo2$ of the second power conversion module 2. Under control of the control unit 3, the DC/DC conversion unit 25 in the first power conversion module 2 and the DC/DC conversion unit 25 in the second power conversion module 2 are operated in the hold mode. Since the DC/DC conversion unit 25 in the first power conversion module 2 and the DC/DC conversion unit 25 in the second power conversion module 2 are operated in the hold mode, the DC bus voltage received by the DC/DC conversion unit 25 in the first power conversion module 2 and the DC/DC conversion unit 25 in the second power conversion module 2 are respectively maintained at $n_1Vo1$ and $n_2Vo2$ according to the changes of the reference voltages. In this time interval, the AC/DC conversion unit 24 in the first power conversion module 2 and the AC/DC conversion unit 24 in the second power conversion module 2 are operated in the power frequency rectification mode. Consequently, the input voltage received by the input terminal 21 of the first power conversion module 2 and the input voltage received by the input terminal 21 of the second power conversion module 2 are respectively maintained at $n_1Vo1$ and $n_2Vo2$ according to the change of the DC bus voltage.

In this time interval, the reference voltage corresponding to the third power conversion module 2 rises from 0V to $n_3Vo3$ (e.g., 800V) and then drops to 0V. Meanwhile, the control unit 3 determines that the reference voltage corresponding to the third power conversion module 2 is lower than the first threshold value $n_3$Vo3 of the third power conversion module 2 and greater than the second threshold value. Under control of the control unit 3, the DC/DC conversion unit 25 in the third power conversion module 2 is operated in the boost mode. Since the DC/DC conversion unit 25 in the third power conversion module 2 is operated in the boost mode, the DC bus voltage received by the DC/DC conversion unit 25 in the third power conversion module 2 rises from 0V to $n_3$Vo3 and then drops to 0V according to the changes of the reference voltages. In this time interval, the AC/DC conversion unit 24 in the third power conversion module 2 is operated in the power frequency rectification mode. Consequently, the input voltage received by the input terminal 21 of the third power conversion module 2 rises from 0V to $n_3$Vo3 and then drops to 0V according to the change of the DC bus voltage.

Obviously, in the time interval between t2 and t3, the power provided by the AC input electric energy is distributed to the three power conversion modules 2. In addition, the power provided to the first power conversion module 2, the power provided to the second power conversion module 2 and the power provided to the third power conversion module 2 are not equal.

In the time interval between t3 and t4, the voltage of the AC input electric energy drops from $n_1$Vo1+$n_2$Vo2 (e.g., 1600V) to $n_1$Vo1 (e.g., 600V). The reference voltage corresponding to the first power conversion module 2 is maintained at $n_1$Vo1. Meanwhile, the control unit 3 determines that the reference voltage corresponding to the first power conversion module 2 is equal to the first threshold value of the first power conversion module 2. Under control of the control unit 3, the DC/DC conversion unit 25 in the first power conversion module 2 is operated in the hold mode. Since the DC/DC conversion unit 25 in the first power conversion module 2 is operated in the hold mode, the DC bus voltage received by the DC/DC conversion unit 25 in the first power conversion module 2 is maintained at $n_1$Vo1 according to the change of the reference voltage. In this time interval, the AC/DC conversion unit 24 in the first power conversion module 2 is operated in the power frequency rectification mode. Consequently, the input voltage received by the input terminal 21 of the first power conversion module 2 is maintained at $n_1$Vo1 according to the change of the DC bus voltage.

In this time interval, the reference voltage corresponding to the second power conversion module 2 drops from $n_2$Vo2 to 0V. Meanwhile, the control unit 3 determines that the reference voltage corresponding to the second power conversion module 2 is lower than the first threshold value of the second power conversion module 2 and greater than the second threshold value. Under control of the control unit 3, the DC/DC conversion unit 25 in the second power conversion module 2 is operated in the boost mode. Since the DC/DC conversion unit 25 in the second power conversion module 2 is operated in the boost mode, the DC bus voltage received by the DC/DC conversion unit 25 in the second power conversion module 2 drops from $n_2$Vo2 to 0V according to the change of the reference voltage. In this time interval, the AC/DC conversion unit 24 in the second power conversion module 2 is operated in the power frequency rectification mode. Consequently, the input voltage received by the input terminal 21 of the second power conversion module 2 drops from $n_2$Vo2 to 0V according to the change of the DC bus voltage.

In this time interval, the reference voltage corresponding to the third power conversion module 2 is 0V. Meanwhile, the control unit 3 determines that the reference voltage corresponding to the third power conversion module 2 is equal to the second threshold value (e.g., 0V). Under control of the control unit 3, the DC/DC conversion unit 25 in the third power conversion module 2 is operated in the bypass mode. Since the DC/DC conversion unit 25 in the third power conversion module 2 is operated in the bypass mode, the DC bus voltage received by the DC/DC conversion unit 25 in the third power conversion module 2 is 0V according to the changes of the reference voltages. In this time interval, the AC/DC conversion unit 24 in the third power conversion module 2 is operated in the bypass mode. Consequently, the input voltage received by the input terminal 21 of the third power conversion module 2 is 0V according to the changes of the DC bus voltage.

Obviously, in the time interval between t3 and t4, the power provided by the AC input electric energy is distributed to the first power conversion module 2 and the second power conversion module 2. In addition, the power provided to the first power conversion module 2 and the power provided to the second power conversion module 2 are not equal.

In the time interval between t4 and To/2, the voltage of the AC input electric energy drops from $n_1$Vo1 (e.g., 600V) to 0V. The reference voltage corresponding to the first power conversion module 2 drops from $n_1$Vo1 to 0V. Meanwhile, the control unit 3 determines that the reference voltage corresponding to the first power conversion module 2 is lower than the first threshold value $n_1$Vo1 of the first power conversion module and greater than the second threshold value. Under control of the control unit 3, the DC/DC conversion unit 25 in the first power conversion module 2 is operated in the boost mode. Since the DC/DC conversion unit 25 in the first power conversion module 2 is operated in the boost mode, the DC bus voltage received by the DC/DC conversion unit 25 in the first power conversion module 2 drops from $n_1$Vo1 to 0V according to the change of the reference voltage. In this time interval, the AC/DC conversion unit 24 in the first power conversion module 2 is operated in the power frequency rectification mode. Consequently, the input voltage received by the input terminal 21 of the first power conversion module 2 drops from $n_1$Vo1 to 0V according to the change of the DC bus voltage.

In this time interval, the reference voltage corresponding to the second power conversion module 2 and the reference voltage corresponding to the third power conversion module 2 are 0V. Meanwhile, the control unit 3 determines that the reference voltage corresponding to the second power conversion module 2 and the reference voltage corresponding to the third power conversion module 2 are equal to the second threshold value. Under control of the control unit 3, the DC/DC conversion unit 25 in the second power conversion module 2 and the DC/DC conversion unit 25 in the third power conversion module 2 are operated in the bypass mode. Since the DC/DC conversion unit 25 in the second power conversion module 2 and the DC/DC conversion unit 25 in the third power conversion module 2 are operated in the bypass mode, the DC bus voltage received by the DC/DC conversion unit 25 in the second power conversion unit 25 and the DC bus voltage received by the DC/DC conversion unit 25 in the third power conversion module 2 are 0V according to the changes of the reference voltages. In this time interval, the AC/DC conversion unit 24 in the second power conversion module 2 and the AC/DC conversion unit 24 in the third power conversion module 2 are operated in the bypass mode. Consequently, the input voltage received by the input terminal 21 of the second power conversion module 2 and the input voltage received by the input terminal 21 of the third power conversion module 2 are 0V according to the changes of the DC bus voltage.

Obviously, in the time interval between t4 and To/2, the entire of the power provided by the AC input electric energy is distributed to the first power conversion module 2. In addition, the power provided to the second power conversion module 2 and the power provided to the third power conversion module 2 are zero.

In the embodiment of FIG. 3B, the amplitudes of the three reference voltages corresponding to the three power conversion modules are equal. In the embodiment of FIG. 5B, the amplitudes of the three reference voltages corresponding to the three power conversion modules are different. That is, the first threshold values corresponding to the power conversion modules are different. The control method of FIG. 5B is similar to the control method of FIG. 3B, and not redundantly described herein.

In the above embodiments, the cascaded power conversion system includes three power conversion modules. It is noted that the number of the power conversion modules is not restricted. The reference voltages corresponding to N power conversion modules will be described as follows.

Firstly, the reference voltage $V_{dcref1}$ corresponding to the first power conversion module 2 of the N power conversion modules 2 may be expressed as the following formula (1):

$$V_{deref1} = \begin{cases} |Vin|, & t \in [0, t_1] \\ n_1 Vo1, & t \in \left[t_1, \dfrac{T_o}{4}\right] \end{cases} \tag{1}$$

$$t_1 = \frac{1}{\omega_0} * \arcsin\left(\frac{n_1 Vo1}{Vin}\right)$$

In the formula (1), Vin represents the input voltage of the AC input electric energy, $n_1$ is the transformation ratio of the transformer 251 of the DC/DC conversion unit 25 in the first power conversion module 2, and Vo1 represents the output voltage of the first power conversion module 2.

When the cascaded power conversion system 1 is coupled with a power grid (not shown), the input voltage Vin is equal to the $V_g$ sin (ωt). In the formula (1), the first reference voltage $V_{dcref1}$ corresponding to the first conversion module 2 is |Vin| or $n_i$|Vo1| within ¼ period of the input voltage. In the time interval between 0 and t1, the first reference voltage $V_{dcref1}$ corresponding to the first conversion module 2 is equal to |Vin|. Under control of the control unit 3, the DC/DC conversion unit 25 in the first power conversion module 2 is operated in the boost mode. Consequently, the DC bus voltage received by the DC/DC conversion unit 25 in the first power conversion module 2 is equal to |Vin| according to the change of the reference voltage. In the time interval between t1 and To/4, the first reference voltage $V_{dcref1}$ corresponding to the first conversion module 2 is equal to $n_1$Vo1. Under control of the control unit 3, the DC/DC conversion unit 25 in the first power conversion module 2 is operated in the hold mode. Consequently, the DC bus voltage received by the DC/DC conversion unit 25 in the first power conversion module 2 is equal to $n_1$Vo1 according to the change of the reference voltage.

Moreover, the reference voltage $V_{dcref i}$ corresponding to the i-th power conversion module 2 of the N power conversion modules 2 may be expressed as the following formula (2):

$$V_{dcref i} = \begin{cases} 0, & t \in [0, t_{i-1}] \\ |V_{in}| - \displaystyle\sum_{m=1}^{i-1} n_m V_{om}, & t \in [t_{i-1}, t_i] \\ n_i V_{o,1}, & t \in \left[t_i, \dfrac{T_o}{4}\right] \end{cases} \tag{2}$$

$$\begin{cases} t_{i-1} = \dfrac{1}{\omega_0} * \arcsin\left(\displaystyle\sum_{m=1}^{i-1} \dfrac{n_m V_{om}}{V_{in}}\right) \\ t_i = \dfrac{1}{\omega_0} * \arcsin\left(\displaystyle\sum_{m=1}^{i} \dfrac{n_m V_{om}}{V_{in}}\right) \end{cases}$$

In the formula (2), i is a positive integer larger than 1 or smaller than N, the i-th power conversion module 2 represents one of the second power conversion module 2 to the (N−1)-th power conversion module 2, $n_i$ is the transformation ratio of the transformer 251 of the DC/DC conversion unit 25 in the i-th power conversion module 2, and Voi represents the output voltage of the i-th power conversion module 2.

In the formula (2), the i-th reference voltage $V_{dcref1}$ corresponding to the i-th conversion module 2 is 0, $$|Vin| - \sum_{m=1}^{i-1} n_m Vom$$

or $n_i$Voi within ¼ period of the input voltage. In the time interval between 0 and $t_{i-1}$, the reference voltage $V_{dcref1}$ corresponding to the i-th conversion module 2 is zero. Under control of the control unit 3, the DC/DC conversion unit 25 in the i-th power conversion module 2 is operated in the bypass mode. Consequently, the DC bus voltage received by the DC/DC conversion unit 25 in the i-th power conversion module 2 is equal to the zero according to the change of the reference voltage. In the time interval between $t_{i-1}$ and $t_i$, the reference voltage $V_{dcref1}$ corresponding to the i-th conversion module 2 is equal to $$|Vin| - \sum_{m=1}^{i-1} n_m Vom.$$

Under control of the control unit 3, the DC/DC conversion unit 25 in the i-th power conversion module 2 is operated in the boost mode. Consequently, the DC bus voltage received by the DC/DC conversion unit 25 in the i-th power conversion module 2 is equal to the $$|Vin| - \sum_{m=1}^{i-1} n_m Vom$$

according to the change of the reference voltage. In the time interval between $t_i$ and To/4, the reference voltage $V_{dcref i}$ corresponding to the i-th conversion module 2 is equal to $n_i$Voi. Under control of the control unit 3, the DC/DC conversion unit 25 in the i-th power conversion module 2 is operated in the hold mode. Consequently, the DC bus voltage received by the DC/DC conversion unit 25 in the i-th power conversion module 2 is equal to $n_i$Voi according to the change of the reference voltage.

Moreover, the reference voltage $V_{dcref N}$ corresponding to the N-th power conversion module 2 of the N power conversion modules 2 may be expressed as the following formula (3):

$$V_{dcrefN} = \begin{cases} 0, & t \in [0, t_{N-1}] \\ |V_{in}| - \sum_{m=1}^{N-1} n_m V_{om}, & t \in [t_{N-1}, T_o/4] \end{cases} \quad (3)$$

$$t_{N-1} = \frac{1}{\omega_0} * \arcsin\left(\sum_{m=1}^{M-1} \frac{n_m V_{om}}{V_{in}}\right)$$

In the formula (3), the N-th reference voltage $V_{dcrefN}$ corresponding to the N-th conversion module 2 is 0 or $$|Vin| - \sum_{m=1}^{i-1} n_m Vom$$

within ¼ period of the input voltage. In the time interval between 0 and $t_{N-1}$, the reference voltage $V_{dcrefN}$ corresponding to the N-th conversion module 2 is zero. Under control of the control unit 3, the DC/DC conversion unit 25 in the N-th power conversion module 2 is operated in the bypass mode. Consequently, the DC bus voltage received by the DC/DC conversion unit 25 in the N-th power conversion module 2 is equal to zero according to the change of the reference voltage. In the time interval between $t_{N-1}$ and To/4, the reference voltage $V_{dcrefN}$ corresponding to the N-th conversion module 2 is equal to $$|Vin| - \sum_{m=1}^{i-1} n_m Vom.$$

Under control of the control unit 3, the DC/DC conversion unit 25 in the N-th power conversion module 2 is operated in the boost mode. Consequently, the DC bus voltage received by the DC/DC conversion unit 25 in the N-th power conversion module 2 is equal to $$|Vin| - \sum_{m=1}^{i-1} n_m Vom$$

according to the change of the reference voltage.

Please refer to FIG. 6 and FIGS. 2A and 2B. FIG. 6 is a flowchart of a power distribution method for a cascaded power conversion system according to an embodiment of the present disclosure.

Firstly, in a step S1, N reference voltages are acquired. The N reference voltages are respectively used as reference values of DC bus voltages of the N power conversion modules 2.

Then, in a step S2, an operating mode of the DC/DC conversion unit 25 in each power conversion module 2 is controlled by the control unit 3 according to the corresponding reference voltage. Within ¼ period of a voltage of the AC input electric energy, the operating modes of the N DC/DC conversion unit 25 in the N power conversion module 2 include a bypass mode, a boost mode and a hold mode.

In the step S2, the operating mode of each power conversion module 2 is determined according to the following criteria. For example, if the reference voltage corresponding to a specified power conversion module 2 is equal to a first threshold value of the specified power conversion module, the DC/DC conversion unit 25 in the specified power conversion module 2 is operated in the hold mode under control of the control unit 3. Moreover, if the reference voltage corresponding to the specified power conversion module 2 is lower than the first threshold value of the specified power conversion module and greater than a second threshold value of the specified power conversion module, the DC/DC conversion unit 25 in the specified power conversion module 2 is operated in the boost mode under control of the control unit 3. Moreover, if the reference voltage corresponding to the specified power conversion module 2 is lower than or equal to the second threshold value of the specified power conversion module, the DC/DC conversion unit 25 in the specified power conversion module 2 is operated in the bypass mode under control of the control unit 3. The first threshold values corresponding to the N power conversion modules 2 may be identical or different. The second threshold value is zero or a positive voltage close to zero.

Figure 7:
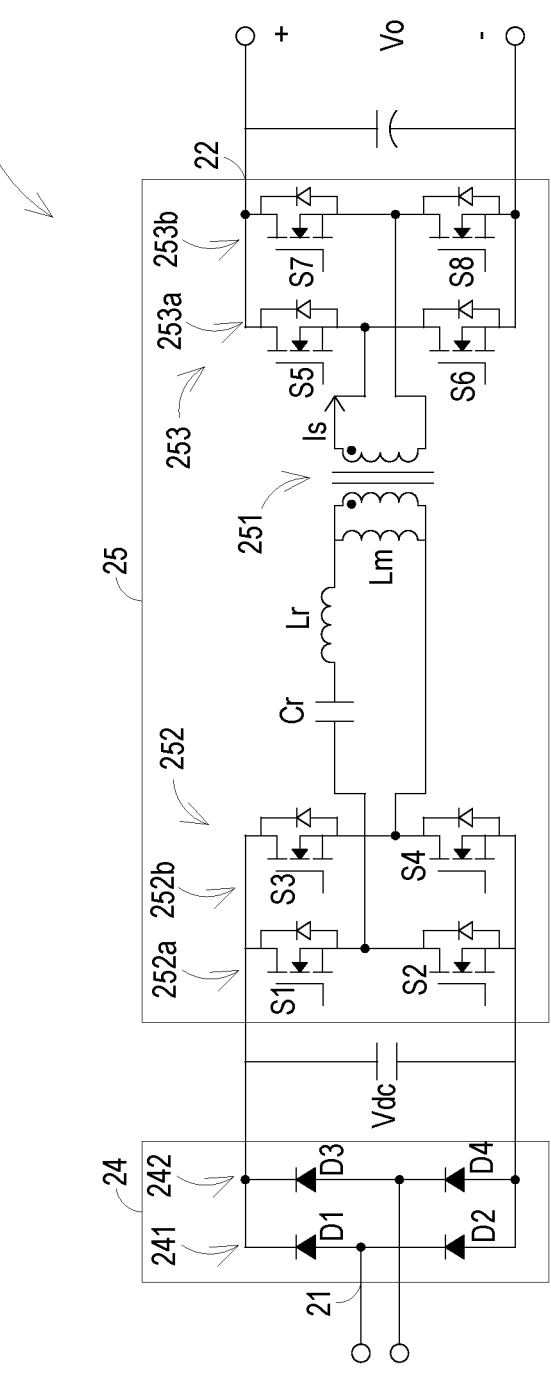
FIG. 7 is a schematic circuit diagram illustrating the detailed circuitry topology of the power conversion module in the cascaded power conversion system as shown in FIG. 2A.

Please refer to FIG. 7 and FIGS. 2A, 2B, 3A and 3B. FIG. 7 is a schematic circuit diagram illustrating the detailed circuitry topology of the power conversion module in the cascaded power conversion system as shown in FIG. 2A. In FIG. 7, only one power conversion module 2 in the cascaded power conversion system 1 is shown.

As shown in FIG. 7, the AC/DC conversion unit 24 of the power conversion module 2 is a diode uncontrolled rectifier. The AC/DC conversion unit 24 includes a first bridge arm 241 and a second bridge arm 242, which are connected with each other in parallel. The first bridge arm 241 includes two diodes D1 and D2, which are connected with each other in series. The second bridge arm 242 includes two diodes D3 and D4, which are connected with each other in series.

The DC/DC power conversion unit 25 of the power conversion module 2 is a full-bridge circuit. The DC/DC power conversion unit 25 of the power conversion module 2 includes a transformer 251, a primary circuit 252, a secondary circuit 253, a resonant capacitor Cr, a resonant inductor Lr and a magnetizing inductor Lm.

The primary circuit 252 is electrically connected with the input terminal of the DC/DC conversion unit 25. The primary circuit 252 includes a third bridge arm 252a and a fourth bridge arm 252b, which are connected with each other in parallel. The third bridge arm 252a includes two switches S1 and S2, which are connected with each other in series. The connection point between the two switches S1 and S2 is a first node. The fourth bridge arm 252b includes two switches S3 and S4, which are connected with each other in series. The connection point between the two switches S3 and S4 is a second node.

The transformer 251 includes a primary winding and a secondary winding.

The resonant capacitor Cr and the resonant inductor Lr are connected between the first node and the first terminal of the primary winding in series. The second terminal of the primary winding is connected with the second node. The magnetizing inductor Lm is connected with the primary winding in parallel.

The secondary circuit 253 is electrically connected with the output terminal of the DC/DC conversion unit 25 (i.e., the output terminal 22 of the power conversion module 2). The secondary circuit 253 includes a fifth bridge arm 253a and the sixth bridge arm 253b, which are connected with each other in parallel. The fifth bridge arm 253a includes two switches S5 and S6, which are connected with each other in parallel. The connection point between the two switches S5 and S6 is a third node. The sixth bridge arm 253b includes two switches S7 and S8, which are connected with each other in parallel. The connection point between the two switches S7 and S8 is a fourth node. The third node is connected with the first terminal of the secondary winding. The fourth node is connected with the second terminal of the secondary winding.

Figure 8:
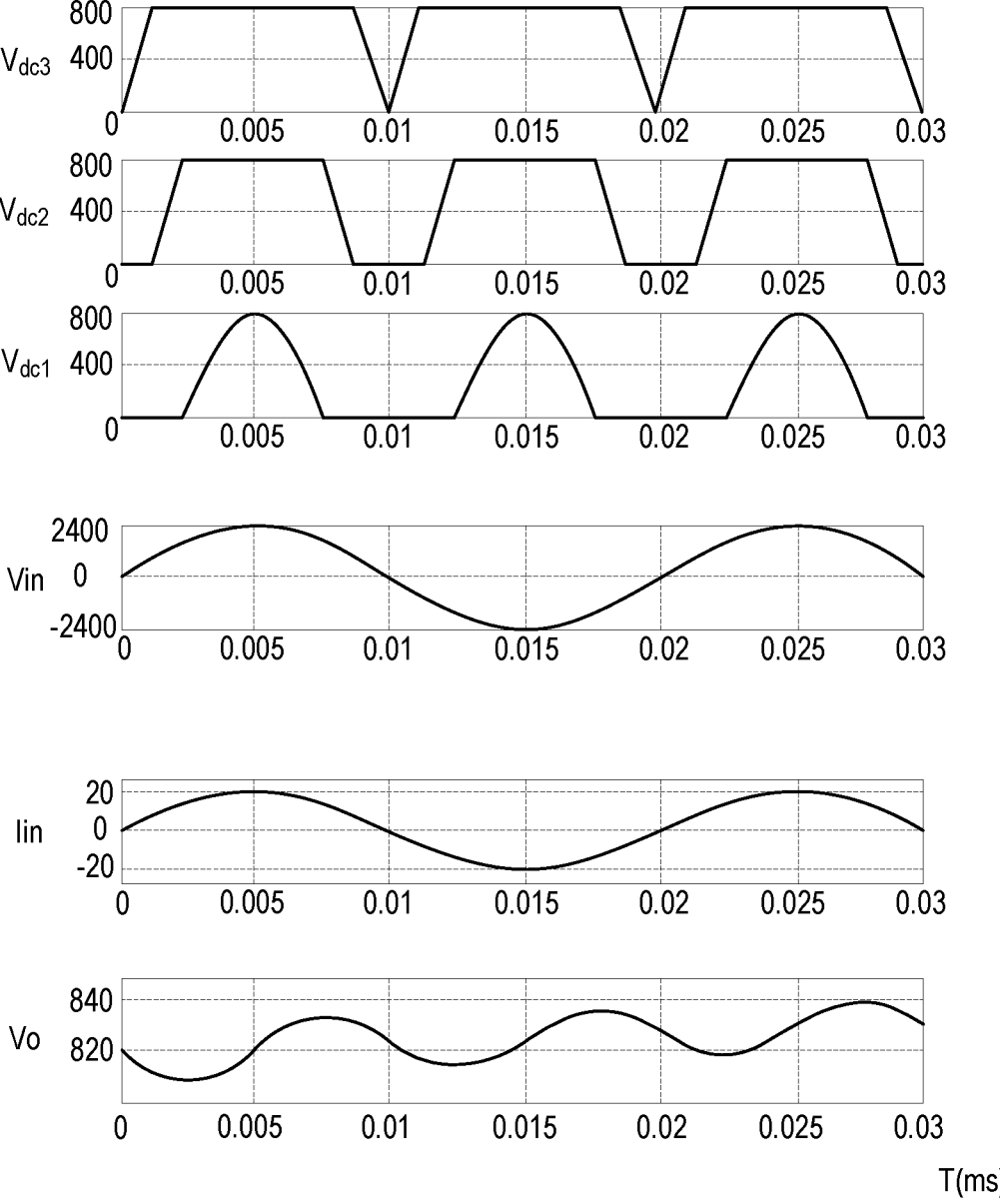
FIG. 8 is a schematic waveform diagram illustrating associated voltage/current signals of the cascaded power conversion system as shown in FIG. 2A.

Please refer to FIG. 8 and FIGS. 2A, 2B, 3A, 3B and 7. FIG. 8 is a schematic waveform diagram illustrating associated voltage/current signals of the cascaded power conversion system as shown in FIG. 2A. In FIG. 8, $V_{dc1}$ represents the DC bus voltage of the first power conversion module 2, $V_{dc2}$ represents the DC bus voltage of the second power conversion module 2, $V_{dc3}$ represents the DC bus voltage of the third power conversion module 2, Vin represents the input voltage of the AC input electric energy, Iin represents the input current, and Vo represents the output voltage. As shown in FIG. 8, the DC bus voltages of the power conversion modules 2 are following the reference voltages shown in FIG. 3B. In addition, the input voltage of the AC input electric energy, the input current and the output voltage can be effectively controlled.

Figure 9A:
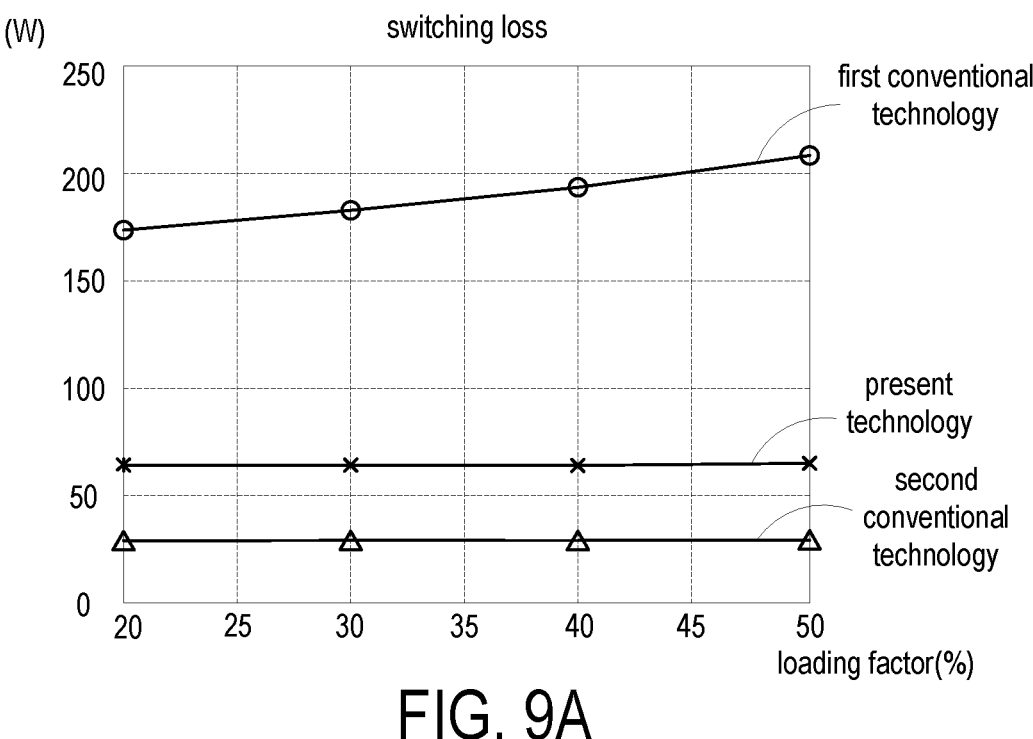
FIG. 9A is a plot illustrating the relationship between the switching loss and the loading factor for the cascaded power conversion systems of the first conventional technology, the second conventional technology and the present technology.
Figure 9B:
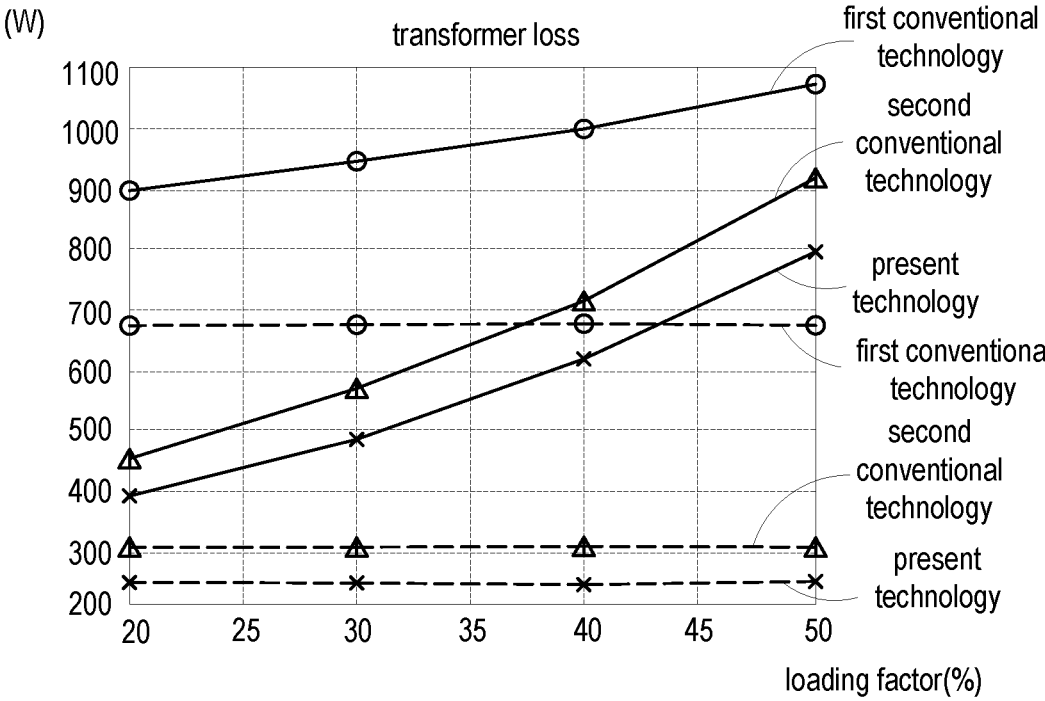
FIG. 9B is a plot illustrating the relationship between the transformer loss and the loading factor for the cascaded power conversion systems of the first conventional technology, the second conventional technology and the present technology.
Figure 9C:
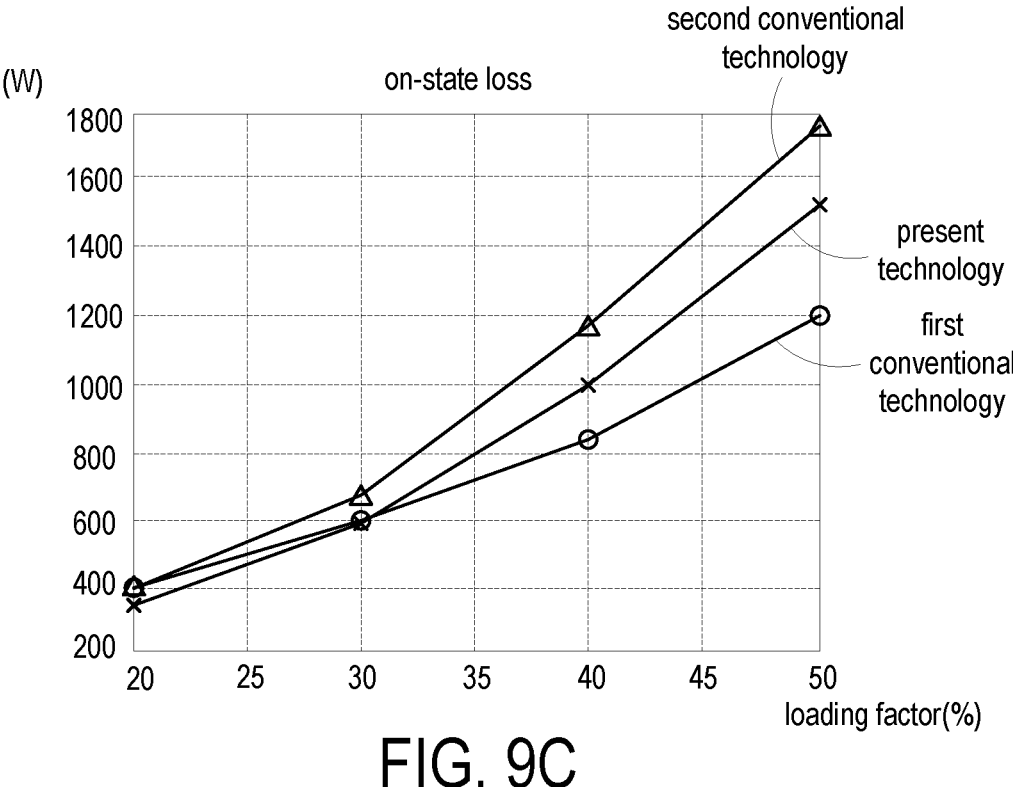
FIG. 9C is a plot illustrating the relationship between the on-state loss and the loading factor for the cascaded power conversion systems of the first conventional technology, the second conventional technology and the present technology.
Figure 9D:
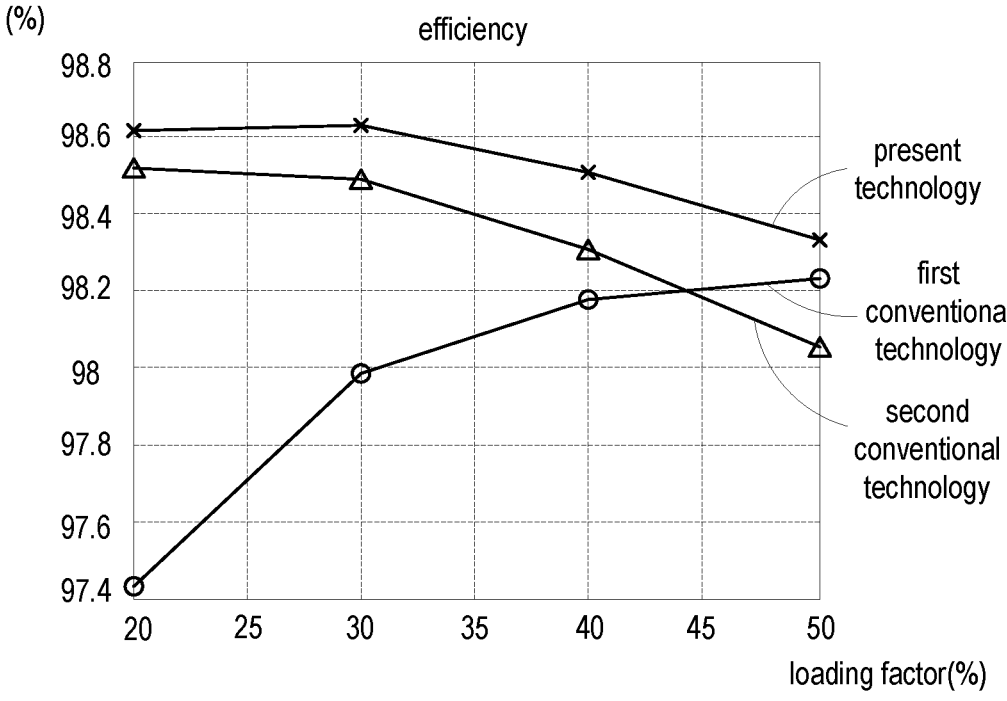
FIG. 9D is a plot illustrating the relationship between the efficiency and the loading factor for the cascaded power conversion systems of the first conventional technology, the second conventional technology and the present technology.

Please refer to FIGS. 9A, 9B, 9C and 9D. FIG. 9A is a plot illustrating the relationship between the switching loss and the loading factor for the cascaded power conversion systems of the first conventional technology, the second conventional technology and the present technology. FIG. 9B is a plot illustrating the relationship between the transformer loss and the loading factor for the cascaded power conversion systems of the first conventional technology, the second conventional technology and the present technology. FIG. 9C is a plot illustrating the relationship between the on-state loss and the loading factor for the cascaded power conversion systems of the first conventional technology, the second conventional technology and the present technology. FIG. 9D is a plot illustrating the relationship between the efficiency and the loading factor for the cascaded power conversion systems of the first conventional technology, the second conventional technology and the present technology. In FIG. 9B, the solid line represents the transformer loss, and the dashed line represents the transformer core loss.

As shown in FIG. 9A, the switching loss of the cascaded power conversion system of the present is considerably lower than the witching loss of the first conventional technology at various loading factors. As shown in FIG. 9B, the transformer loss and the transformer core loss of the cascaded power conversion system of the present disclosure are effectively reduced at various loading factors when compared with the first conventional technology and the second conventional technology. In case that the loading factor is lower than 50%, the AC/DC conversion unit 24 in the power conversion module of the present cascaded power conversion system is operated in the low frequency rectification mode or the bypass mode. Consequently, the operation of the AC/DC conversion unit 24 in the front stage does not generate the switching loss. In case that the DC/DC converter in the power conversion module is operated in the bypass mode, the switching loss is zero and the transformer core loss is zero. Consequently, the total switching loss and the total transformer loss are reduced. In the situation that the percentage of the switching loss or the percentage of the core loss is high, the systematic efficiency of the present cascaded power conversion system is obviously enhanced when compared with the conventional technologies. As shown in FIG. 9C, the on-state loss increases with the increasing loading factor. In addition, the on-state loss of the present cascaded power conversion system is greater than the on-state loss of the first conventional technology. However, in case that the loading factor is lower than 50%, the transformer loss and the switching loss of the cascaded power conversion system account for the main portion, while the on-state loss accounts for a relatively small portion. As shown in FIG. 9D, the efficiency of the cascaded power conversion system of the present disclosure is obviously enhanced.

In an embodiment, the reference voltages corresponding to the N power conversion modules of the cascaded power conversion system are periodically exchanged to distribute the power. Consequently, the capacity and the loss of the power conversion modules can be more uniform. For example, the cascaded power conversion system includes four power conversion modules. The output voltages of the four power conversion modules are equal. The amplitudes of the reference voltages corresponding to the four power conversion modules are equal (e.g., equal to 1000V).

Figures 10A, 10B:
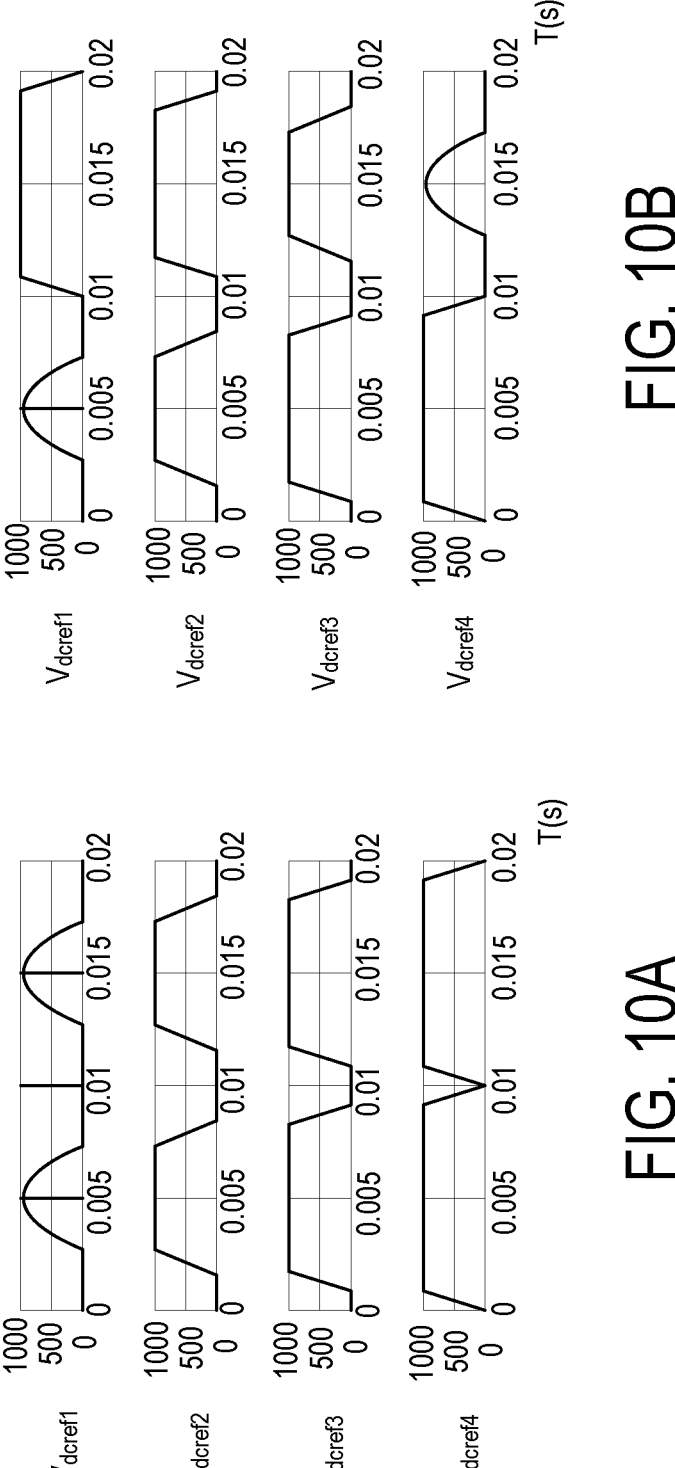
FIG. 10A is a schematic waveform diagram illustrating the reference voltages corresponding to the four power conversion modules of the cascaded power conversion system of the present disclosure, in which the reference voltages are not exchanged.
FIG. 10B is a schematic waveform diagram illustrating the reference voltages corresponding to the four power conversion modules of the cascaded power conversion system of the present disclosure, in which the reference voltages are periodically exchanged at a time interval of 10 ms.
Figure 10C:
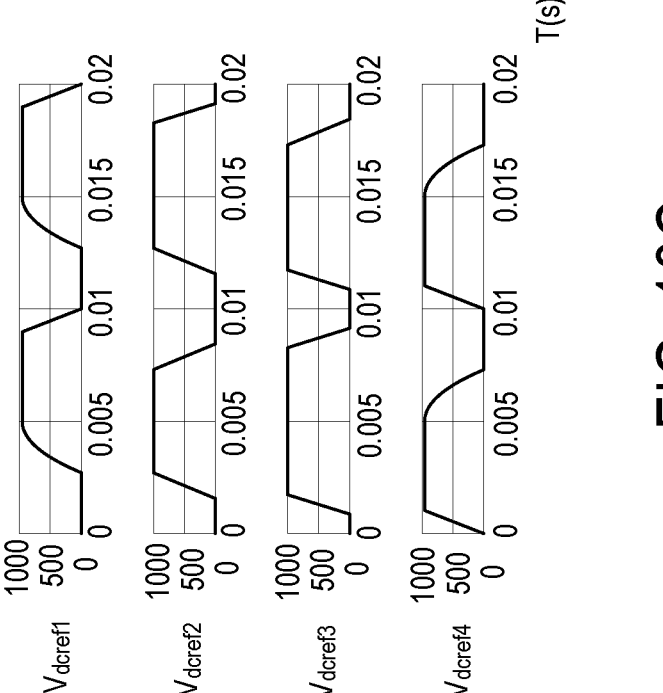
FIG. 10C is a schematic waveform diagram illustrating the reference voltages corresponding to the four power conversion modules of the cascaded power conversion system of the present disclosure, in which the reference voltages are periodically exchanged at a time interval of 5 ms.

FIG. 10A is a schematic waveform diagram illustrating the reference voltages corresponding to the four power conversion modules of the cascaded power conversion system of the present disclosure, in which the reference voltages are not exchanged. FIG. 10B is a schematic waveform diagram illustrating the reference voltages corresponding to the four power conversion modules of the cascaded power conversion system of the present disclosure, in which the reference voltages are periodically exchanged at a time interval of 10 ms. FIG. 10C is a schematic timing waveform diagram illustrating the reference voltages corresponding to the four power conversion modules of the cascaded power conversion system of the present disclosure, in which the reference voltages are periodically exchanged at a time interval of 5 ms.

In FIGS. 10A, 10B and 10C, the waveform of the reference voltage $V_{dcref1}$ corresponding to the first power conversion module 2, the waveform of the reference voltage $V_{dcref2}$ corresponding to the second power conversion module 2, the waveform of the reference voltage $V_{dcref3}$ corresponding to the third power conversion module 2 and the waveform of the reference voltage $V_{dcref4}$ corresponding to the fourth power conversion module 2 are shown. After a set time (e.g., 5 ms), the sequence of the fourth reference voltages is altered. For example, in the time interval between t=0 and t=5 ms, the waveforms of the reference voltages corresponding to the four power conversion modules as shown in FIG. 10C are identical to the waveforms of the reference voltages corresponding to the four power conversion modules as shown in FIG. 10A. In the time interval between t=5 ms and t=10 ms, the waveform of the reference voltage $V_{dcref1}$ as shown in FIG. 10C and the waveform of the reference voltage $V_{dcref4}$ as shown in FIG. 10A are identical. That is, in FIG. 10C, the reference voltage corresponding to the first power conversion module and the reference voltage corresponding to the fourth power conversion module are exchanged. In addition, the waveform of the reference voltage $V_{dcref2}$ as shown in FIG. 10C and the waveform of the reference voltage $V_{dcref3}$ as shown in FIG. 10A are identical. That is, in FIG. 10C, the reference voltage corresponding to the second power conversion module and the reference voltage corresponding to the third power conversion module are exchanged.

In the time interval between t=0 and t=5 ms, the fourth power conversion module is operated in the boost mode and then operated in the hold mode, then the third power conversion module is sequentially operated in the boost mode and the hold mode, then the second power conversion module is sequentially operated in the boost mode and the hold mode, and finally the first power conversion module is operated in the boost mode. After the set time (e.g., 5 ms), e.g., in the time interval between t=5 ms and t=10 ms, the sequence of the fourth reference voltages is altered. In other words, the operating modes of the four power conversion modules are rearranged. Since the reference voltages are periodically exchanged, the capacity and the loss of the power conversion modules can be more balanced.

Preferably, the set time for exchanging the reference voltage is 5 ms. Since the reference voltages are periodically exchanged, the capacity and the loss of the N power conversion modules of the cascaded power conversion system can be more uniform. In the embodiment of FIG. 10B, the set time for exchanging the reference voltage is 10 ms. The operations of FIG. 10B are similar to those of FIG. 10C, and not redundantly described herein.

In an embodiment, the set time for exchanging the reference voltages is M/4 of the power frequency period, wherein M is equal to 1, 2 or 3. For example, in case that the power frequency period is 20 ms, the set time for exchanging the reference voltages is 5 ms, 10 ms or 15 ms. Preferably, the set time for exchanging the reference voltages is 5 ms, and thus the power distributions among the N power conversion modules of the cascaded power conversion system can be the most uniform.

In the above embodiments, the cascaded power conversion system includes N AC/DC conversion units and N DC/DC conversion units. In some embodiments, the cascaded power conversion system includes a single AC/DC conversion unit and N DC/DC conversion units.

Figure 11:
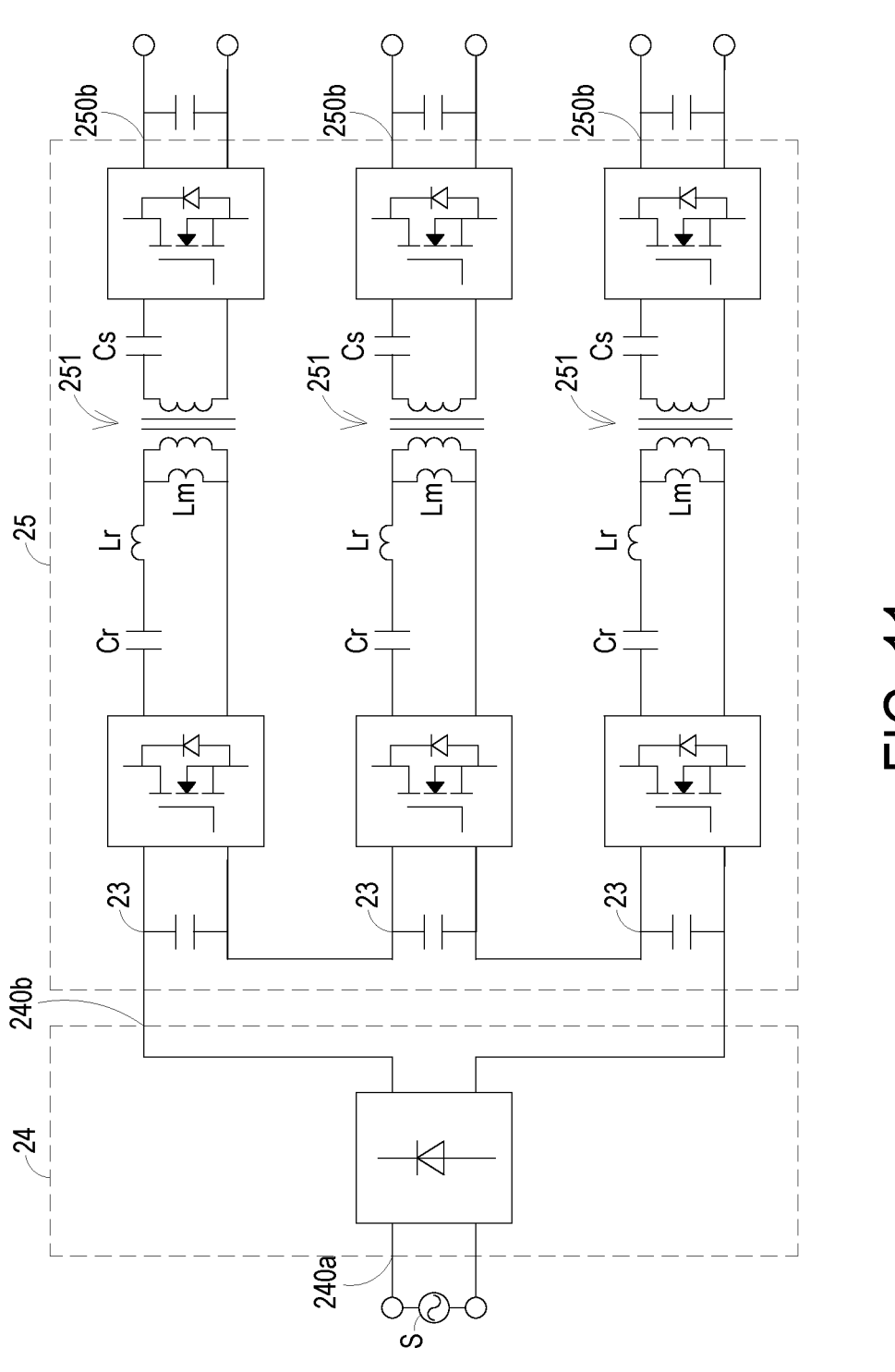
FIG. 11 is a schematic circuit diagram illustrating a cascaded power conversion system according to a fifth embodiment of the present disclosure.

Please refer to FIG. 11. FIG. 11 is a schematic circuit diagram illustrating a cascaded power conversion circuit according to a fifth embodiment of the present disclosure. In comparison with the cascaded power conversion system 1 as shown in FIG. 2A, the cascaded power conversion system 1d of this embodiment only includes a single AC/DC conversion unit 24 and N DC/DC conversion units 25.

The AC/DC conversion unit 24 includes an input terminal 240a and an output terminal 240b. The input terminal 240a of the AC/DC conversion unit 24 is electrically connected with the input power source S. The AC input electric power from input power source S is converted into the DC electric power. Each DC/DC conversion unit 25 includes a DC bus 23 and an output terminal 250b. The DC bus 23 is served as the input terminal of the DC/DC conversion unit 25. The N DC buses 23 of the N DC/DC conversion units 25 are electrically connected with the output terminal 240b of the AC/DC conversion unit 24 in series. In this embodiment, the N output terminals 250b of the N DC/DC power conversion units 25 are electrically connected with the loads L. In another embodiment, the N output terminals 250b of the N DC/DC conversion units 25 are electrically connected with each other in series and then connected with the loads L. Alternatively, the N output terminals 250b of the N DC/DC conversion units 25 are electrically connected with in parallel and then connected with the loads L.

Figure 12:
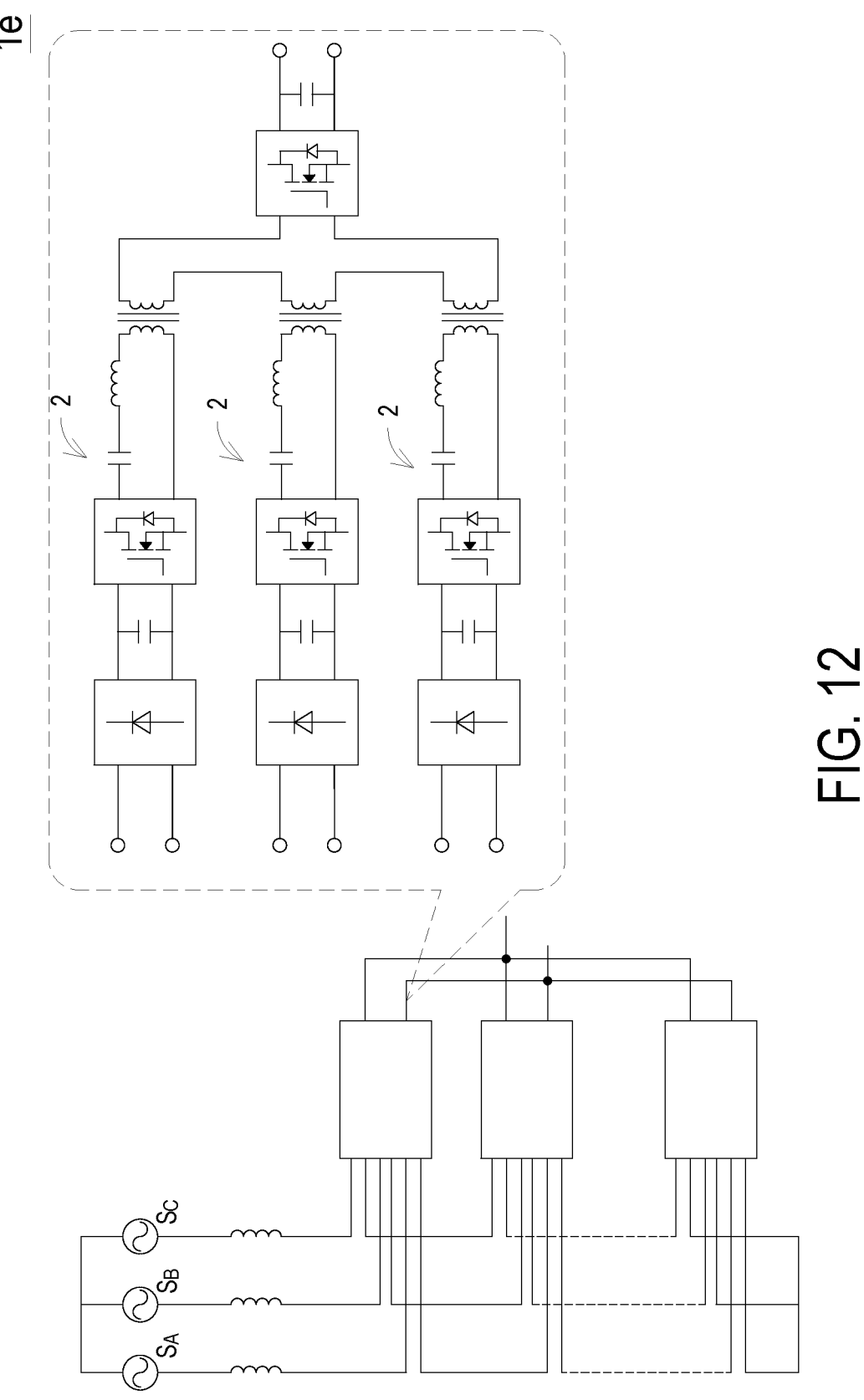
FIG. 12 is a schematic circuit diagram illustrating a cascaded power conversion system according to a sixth embodiment of the present disclosure.

In an embodiment, the cascaded power conversion system 1 is a three-phase system. Please refer to FIG. 12. FIG. 12 is a schematic circuit diagram illustrating a cascaded power conversion circuit according to a sixth embodiment of the present disclosure. In comparison with the cascaded power conversion system 1 as shown in FIG. 2A, the N power conversion modules 2 in the cascaded power conversion system 1e of this embodiment receive the three-phase input power source $S_AS_BS_C$. Each power conversion module 2 includes three AC/DC conversion unit, three DC buses and a DC/DC conversion unit.

The input terminal of the first AC/DC conversion unit in each power conversion module 2 is connected with the input power source $S_A$ in series. The input terminal of the second AC/DC conversion unit in each power conversion module 2 is connected with the input power source $S_B$ in series. The input terminal of the third AC/DC conversion unit in each power conversion module 2 is connected with the input power source $S_C$ in series. The DC/DC conversion unit includes three primary circuits, three transformers and a secondary circuit. The three primary circuits are electrically connected with the corresponding AC/DC conversion units and the corresponding DC buses. The primary sides of the three transformers are electrically connected with the corresponding primary circuits. The secondary sides of the three transformers are connected with each other in series. By the cascaded power conversion system 1e of this embodiment, the double-frequency ripple at the secondary side of the power conversion module 2 is effectively inhibited. Consequently, the power loss of the cascaded power conversion system 1e is reduced.

In the embodiment of FIG. 7, each of the two bridge arms in the AC/DC conversion unit of the cascaded power conversion system includes two diodes. It is noted that the circuitry topology of the AC/DC conversion unit may be modified. FIG. 13A is a schematic circuit diagram illustrating a variant example of the AC/DC conversion unit in the cascaded power conversion system of the present disclosure.

As shown in FIG. 13A, the AC/DC conversion unit 24a includes a synchronous rectifier. The first bridge arm 241 of the AC/DC conversion unit 24a includes two switches S9 and S10, which are connected with each other in series. The second bridge arm 242 includes two switches S11 and S12, which are connected with each other in series.

Figure 13B:
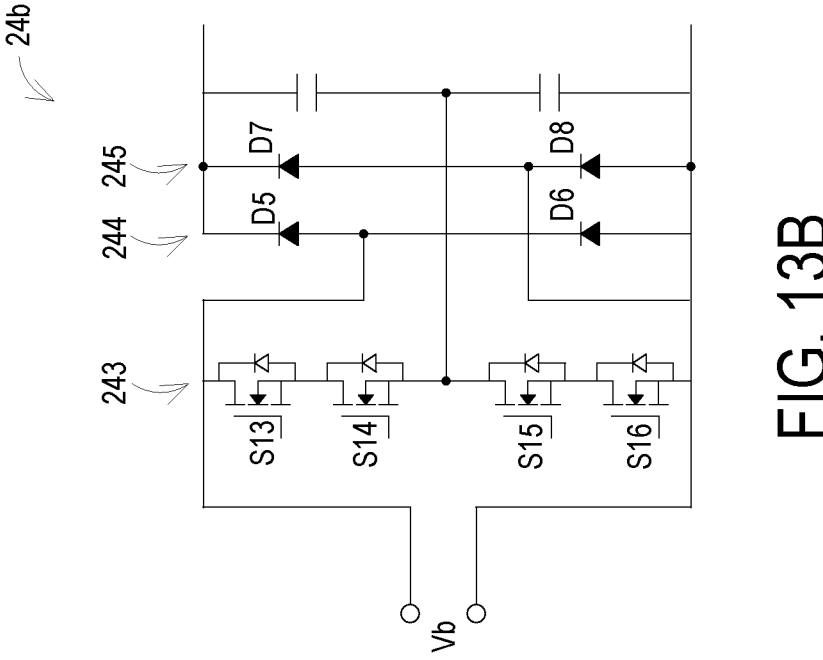
FIG. 13B is a schematic circuit diagram illustrating another variant example of the AC/DC conversion unit in the cascaded power conversion system of the present disclosure.
Figure 13A:
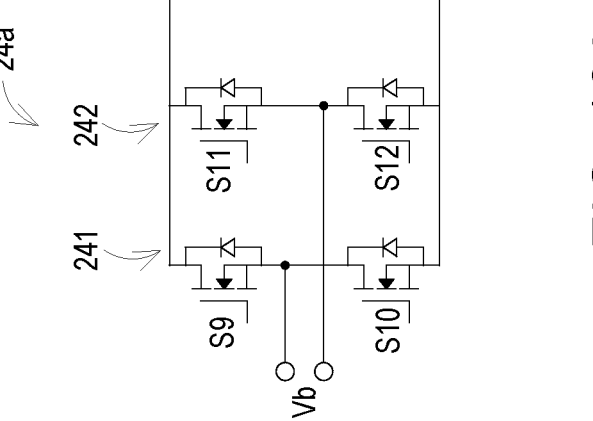
FIG. 13A is a schematic circuit diagram illustrating a variant example of the AC/DC conversion unit in the cascaded power conversion system of the present disclosure.

FIG. 13B is a schematic circuit diagram illustrating another variant example of the AC/DC conversion unit in the cascaded power conversion system of the present disclosure.

The AC/DC conversion unit 24b includes a three-level rectifier circuit. The AC/DC conversion unit 24b includes a seventh bridge arm 243, an eighth bridge arm 244 and a ninth bridge arm 245. The seventh bridge arm 243 includes four switches S13, S14, S15 and S16, which are connected with each other in series. The connection point between the switches S14 and S15 is a fifth node. The eighth bridge arm 244 includes two diodes D5 and D6, which are connected with each other in series. The ninth bridge arm 245 includes two diode D7 and D8, which are connected with each other in series. The connection point between the two diodes D5 and D6 of the eighth bridge arm 244 and the connection point between the two diodes D7 and D8 of the fifth bridge arm 245 are connected with the two terminals of the input power source S, respectively. In this embodiment, the DC bus 23 includes two sub-capacitors which are connected with each other in series. The connection point between the two sub-capacitors is connected with the fifth node.

Figure 14A:
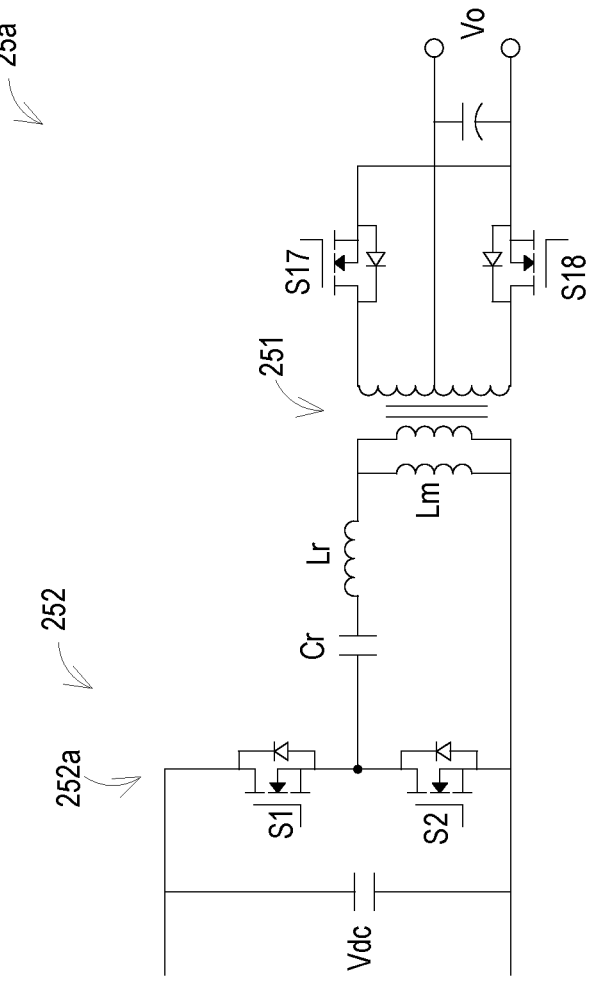
FIG. 14A is a schematic circuit diagram illustrating a variant example of the DC/DC conversion unit in the cascaded power conversion system of the present disclosure.

In the embodiment of FIG. 7, the DC/DC conversion unit 25 includes a full-bridge circuit. It is noted that the circuitry topology of the DC/DC conversion unit may be modified. FIG. 14A is a schematic circuit diagram illustrating a variant example of the DC/DC conversion unit in the cascaded power conversion system of the present disclosure.

In this embodiment, the DC/DC conversion unit 25a includes a half-bridge circuit. The primary circuit 252 of the DC/DC conversion unit 25a only includes a single bridge arm (i.e., the third bridge arm 252a). The third bridge arm 252a includes two switches S1 and S2. The secondary circuit 253 includes two switches S17 and S18 only. The switches S17 and S18 are respectively connected with the two terminals of the secondary winding of the transformer 251.

Figure 14B:
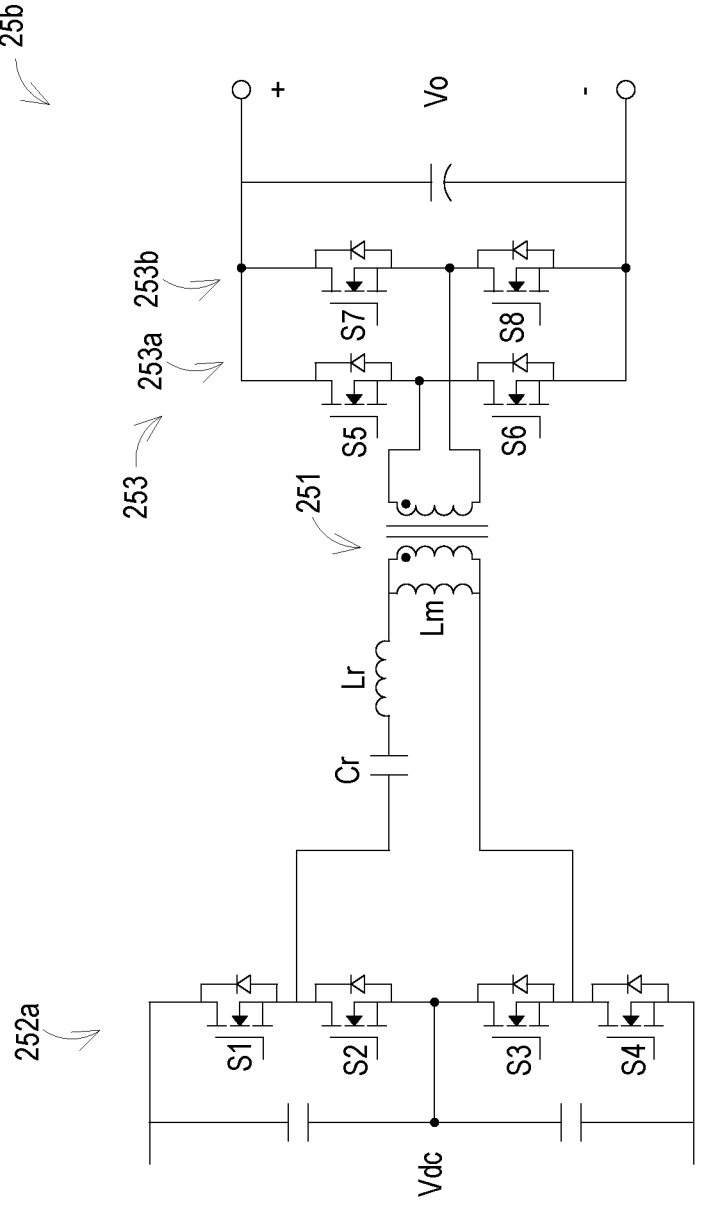
FIG. 14B is a schematic circuit diagram illustrating another variant example of the DC/DC conversion unit in the cascaded power conversion system of the present disclosure.

FIG. 14B is a schematic circuit diagram illustrating another variant example of the DC/DC conversion unit in the cascaded power conversion system of the present disclosure. In this embodiment, the DC/DC conversion unit 25b includes a series-type half-bridge circuit. The primary circuit 252 of the DC/DC conversion unit 25b includes a single bridge arm (i.e., the third bridge arm 252a). The third bridge arm 252a includes four switches S1, S2, S3 and S4. The connection point between the switches S1 and S2 is a first node. The connection point between the two switches S3 and S4 is a second node. The resonant capacitor Cr and the resonant inductor Lr are serially connected between the first node and the first terminal of the primary winding. The second terminal of the primary winding of the transformer 251 is connected with the second node.

Figure 14C:
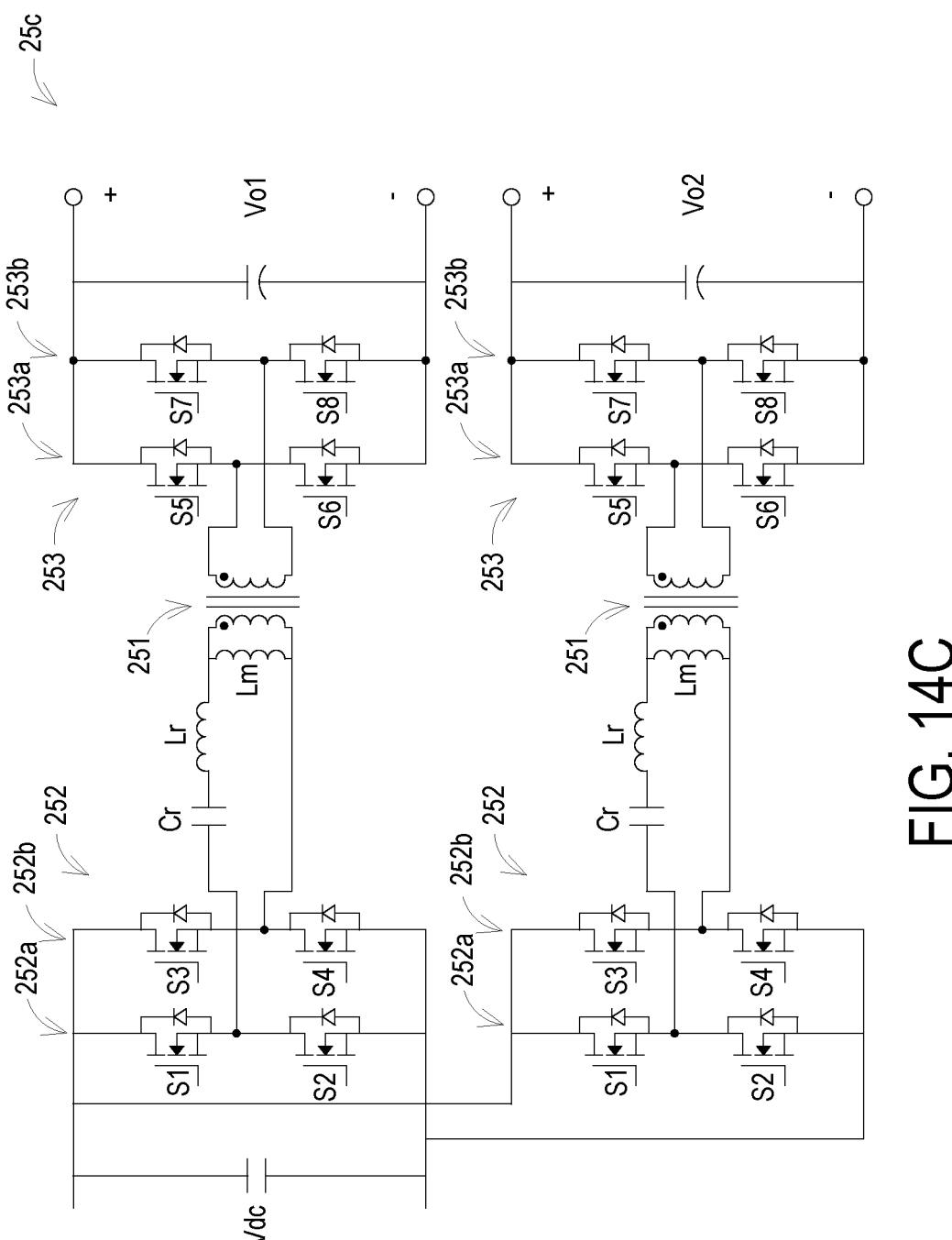
FIG. 14C is a schematic circuit diagram illustrating another variant example of the DC/DC conversion unit in the cascaded power conversion system of the present disclosure.

FIG. 14C is a schematic circuit diagram illustrating another variant example of the DC/DC conversion unit in the cascaded power conversion system of the present disclosure.

In this embodiment, the DC/DC conversion unit 25c includes two full-bridge circuits, which are connected with each other in parallel. The circuitry topology of each full-bridge circuit is similar to the full-bridge circuit as shown in FIG. 7, and not redundantly described herein.

Figure 15:
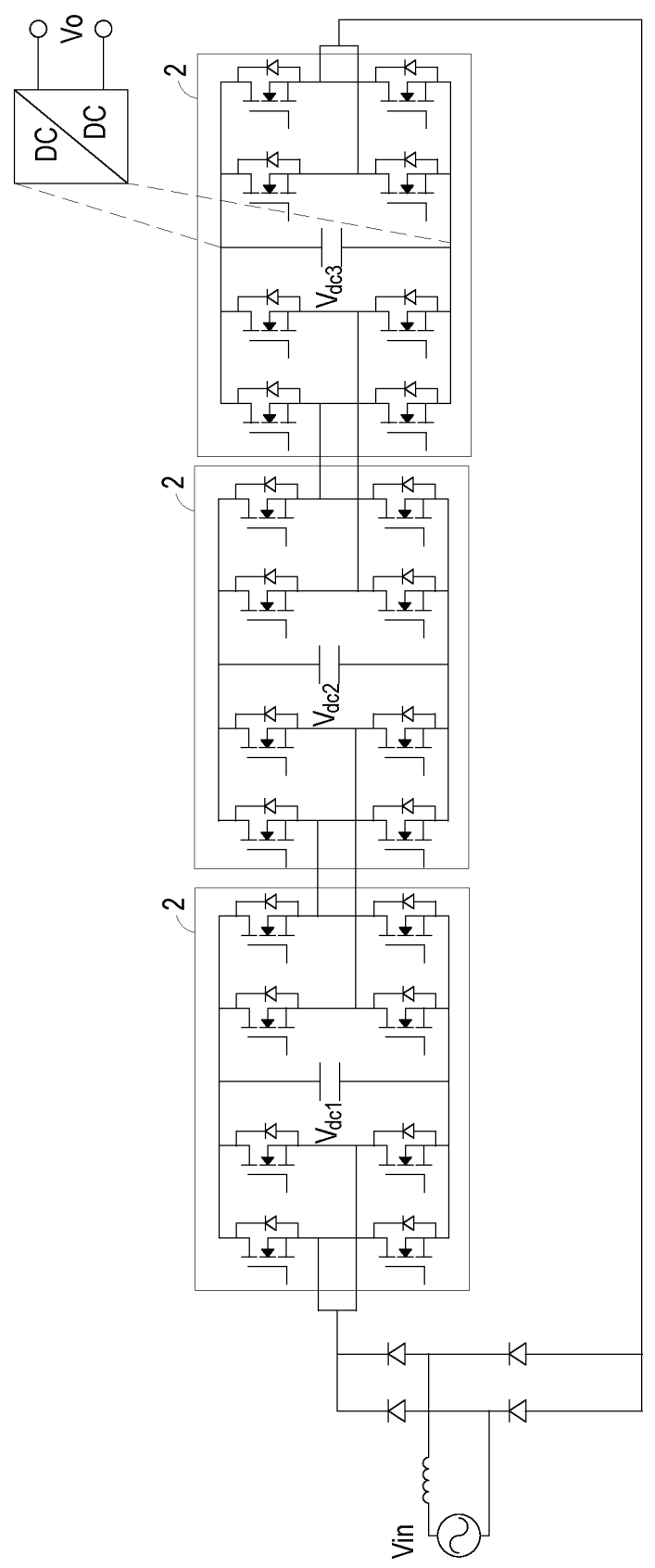
FIG. 15 is a schematic circuit diagram illustrating a cascaded power conversion system according to a seventh embodiment of the present disclosure.

Please refer to FIG. 15. FIG. 15 is a schematic circuit diagram illustrating a cascaded power conversion circuit according to a seventh embodiment of the present disclosure. In above embodiments, the N power conversion modules of the cascaded conversion module are connected with each other in parallel. In this embodiment, the cascaded power conversion system 1f is a modular multilevel series-parallel converter. In addition, the N power conversion modules 2 are connected with each other in series.

Figure 16A:
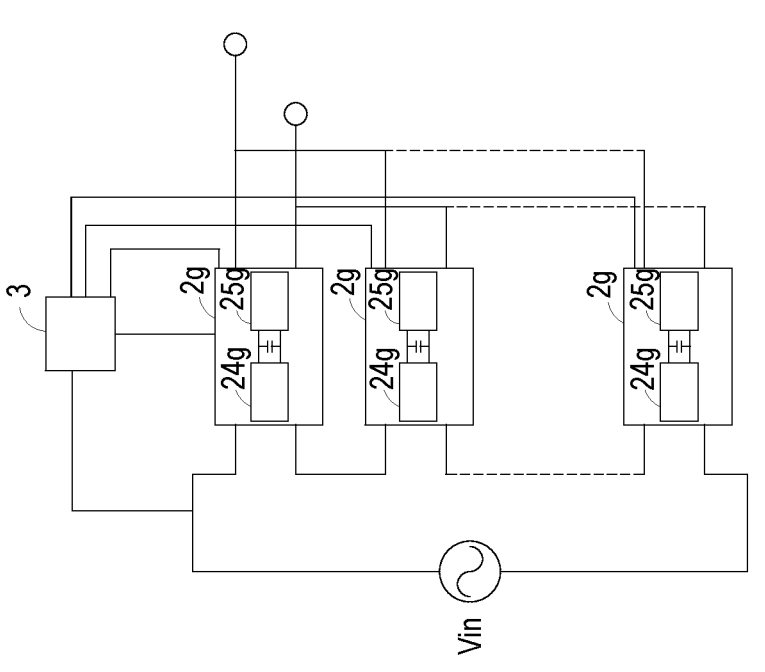
FIG. 16A is a schematic circuit diagram illustrating a cascaded power conversion system according to an eighth embodiment of the present disclosure.
Figure 16B:
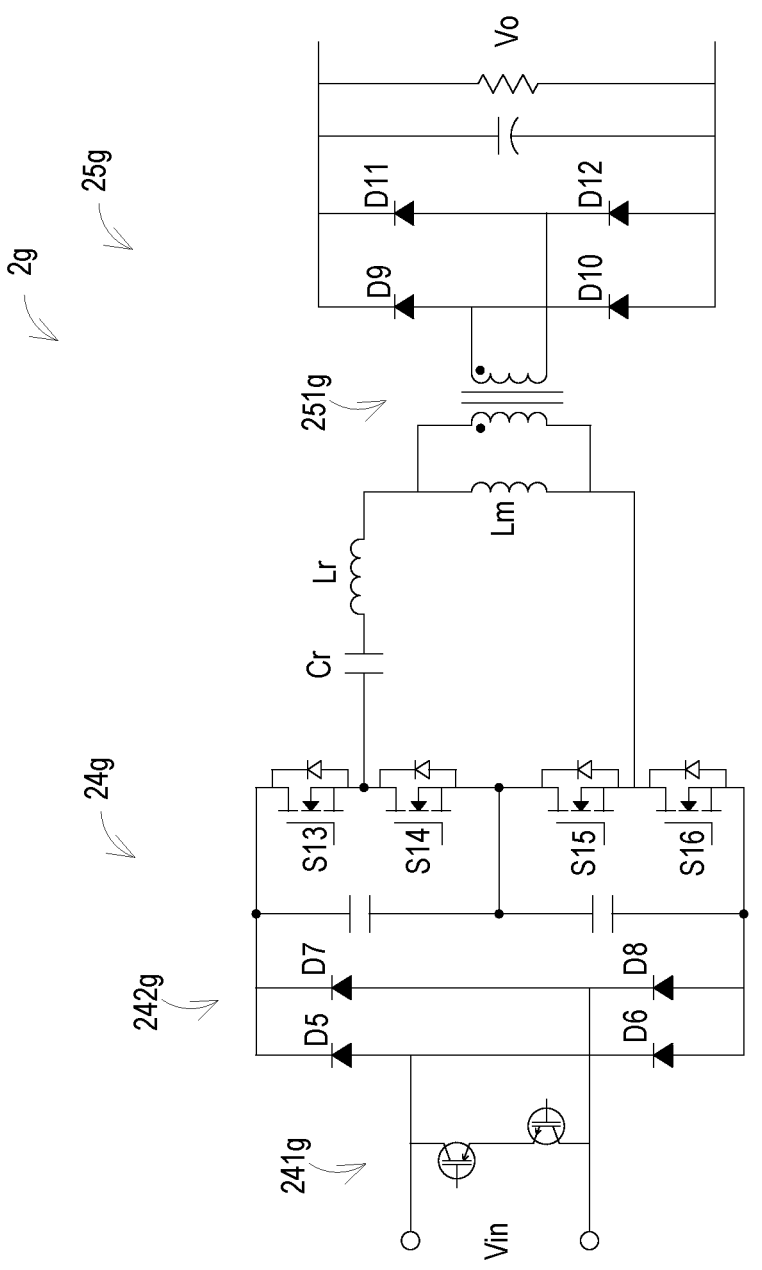
FIG. 16B is a schematic circuit diagram illustrating one power conversion module of the cascaded power conversion system as shown in FIG. 16A.

Please refer to FIG. 16A and FIG. 16B. FIG. 16A is a schematic circuit diagram illustrating a cascaded power conversion system according to an eighth embodiment of the present disclosure. FIG. 16B is a schematic circuit diagram illustrating one power conversion module of the cascaded power conversion system as shown in FIG. 16A. As shown in FIG. 16A, the cascaded power conversion system 1g includes n power conversion modules 2g and a control unit 3. Input terminals 21 of the n power conversion modules 2g are connected with each other in series, and output terminals 22 of the n power conversion modules 2g are connected with each other in parallel. In the embodiment, each of the power conversion modules 2 includes an AC/DC conversion unit 24g and a DC/DC conversion unit 25g, but the present disclosure is not limited thereto. Preferably but not exclusively, the output terminals 22 of the n power conversion modules 2g provide independent output power. Preferably but not exclusively, the n power conversion modules 2g share one AC/DC conversion unit 24g, and the output of the AC/DC conversion unit 24g is electrically connected to the n DC/DC conversion units 25g. As shown in FIG. 16B, the AC/DC conversion unit 24g includes a bypass circuit 241g and a diode rectifier circuit 242g, and the DC/DC conversion unit 25 is an LLC resonant converter. When the AC/DC conversion unit 24g is operated in the bypass mode, the bypass circuit 241g is conducted to bypass the diode rectifier circuit 242g. Notably, the combined architecture of the bypass circuit 241g and the diode rectifier circuit 242g shown in FIG. 16B is applicable to any one of the cascade conversion systems in the above embodiments.

Figure 17:
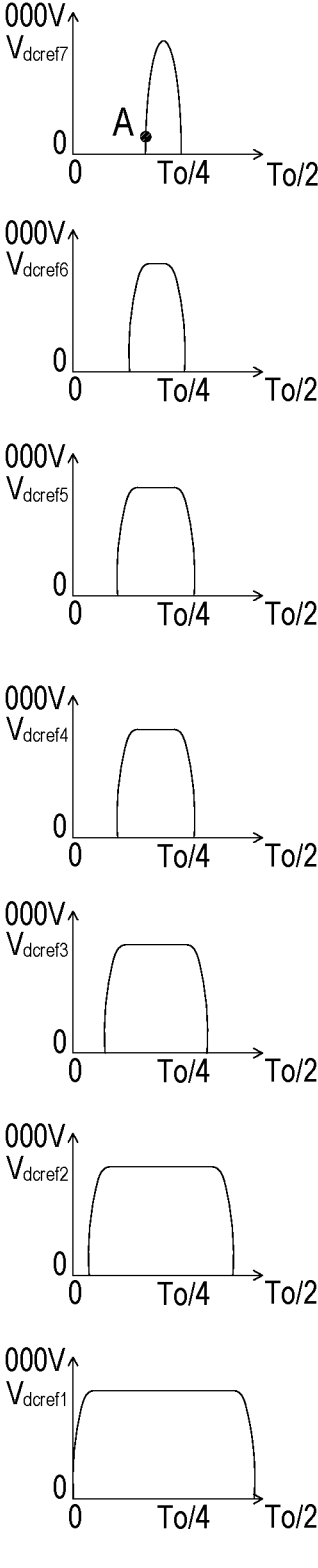
FIG. 17 is a schematic waveform diagram illustrating the reference voltages corresponding to the cascaded power conversion system as shown in FIG. 16A.

Please refer to FIG. 17 in conjunction with FIG. 16A and FIG. 16B. FIG. 17 is a schematic waveform diagram illustrating the reference voltages corresponding to the cascaded power conversion system as shown in FIG. 16A. In the embodiment, the AC input voltage of the AC input electric energy received by the cascaded power conversion system 1g has a period To. For example, the period To is equal to 20 ms. Preferably but not exclusively, the cascaded power conversion system 1g includes seven power conversion modules 2g. In FIG. 17, the waveforms of the reference voltages corresponding to the seventh power conversion module 2g to the first power conversion module 2g are respectively shown from top to bottom. In the embodiment, the output voltages of the seven power conversion modules 2g are equal, and the transformation ratios of the transformers 251 of the DC/DC conversion units 25 in the seven power conversion modules 2g are equal. Therefore, the amplitude of each reference voltage is equal. The seven reference voltages $V_{dcref1} \sim V_{dcref7}$ are assigned to the seven power conversion modules 2g in sequence, and each reference voltage is used as a reference value for the DC bus voltage in the corresponding power conversion module 2g. The control unit 3 controls the DC/DC conversion unit 25g in the corresponding power conversion module 2g to selectively operate in the bypass mode, the boost mode and/or hold the mode according to the range of each corresponding reference voltage. For example, preferably but not exclusively, within ½ period of the AC input power, or even within ¼ period of the AC input power, the seventh power conversion module 2g is controlled to selectively operate in the bypass mode and the boost mode, and the sixth power conversion module 2g is controlled to selectively operate in the bypass mode, the hold mode and the boost mode.

In the embodiment, within ½ period of the AC input power, or even within ¼ period of the AC input power, operating modes of the DC/DC conversion units 25g of the seven power conversion modules 2g include a bypass mode, a boost mode and a hold mode. Moreover, a total voltage of the DC bus voltages of the seven power conversion modules is continuously changing and equal to the absolute of the voltage of the AC input electric energy. Preferably but not exclusively, within ½ period of the AC input power, the actual performance of the seven reference voltages is obtained by using seven horizontal lines to transversely cut the input voltage or the absolute value of the input voltage, so that the input voltage Vin is divided into seven segments, having an identical amplitude but different shapes. Regarding the detailed description of the power conversion module, the method of obtaining the reference voltage, the structure of the control unit, the control method adopted, etc., please refer to the above embodiments and will not be redundantly described herein.

At point A in FIG. 17, the DC/DC conversion unit in the seventh power conversion module is operated in the boost mode. The input voltage is smaller at this time, but when the input current is larger (that is, the input power is larger), the boost control may not be able to achieve soft-switching and the efficiency improvement will not be obvious. The cascade conversion system can switch the control method according to the load condition at the output port to further improve the efficiency of the cascade conversion system. For details, please refer to the description of the ninth embodiment of the present disclosure below.

Figure 18:
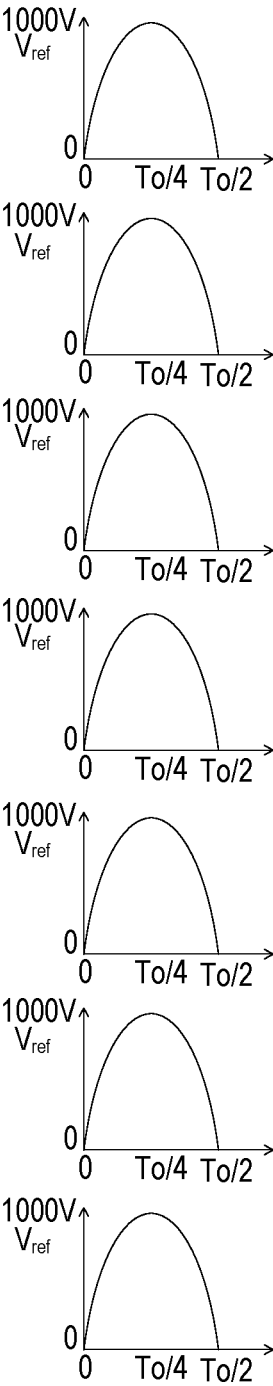
FIG. 18 is a schematic waveform diagram illustrating the reference voltages corresponding to the cascaded power conversion system as shown in FIG. 16A operated in an equalized power mode.

FIG. 16A is used as an example to illustrate the ninth embodiment of the present disclosure, but the control method in the ninth embodiment is also applicable to the above-mentioned cascade conversion systems 1-1f. The cascade conversion system 1g includes two operating modes, namely an equalized power mode and a non-equalized power mode. Please refer to FIG. 18 in conjunction with FIG. 16A and FIG. 16B. FIG. 18 is a schematic waveform diagram illustrating the reference voltages corresponding to the cascaded power conversion system as shown in FIG.

16A operated in an equalized power mode. A load threshold is set. When the load connected to the cascade conversion system 1g or the power conversion module 2g is less than the load threshold, the cascade conversion system 1g is operated in the non-equalized power mode. The non-equalized power mode has been described in detail in the first embodiment to the eighth embodiment, and will not be redundantly described herein. When the load connected to the cascade conversion system 1g or the power conversion module 2g is greater than or equal to the load threshold, the cascade conversion system 1g operates in the equalized power mode. As shown in FIG. 18, within ½ period of the AC input power, the input voltage Vin or the absolute of the input voltage Vin is divided equally to obtain the voltage reference $V_{ref}$. Preferably but not exclusively, each voltage reference $V_{ref}$ is equal to Vin/7 or |Vin|/7. At this time, the seven power conversion modules 2g process the same input power. The AC/DC conversion unit 24g in each power conversion module 2g is operated in the power frequency rectification mode, and the DC/DC conversion unit 25g is operated in the boost mode. In the equalized power mode, all the power conversion modules 2g of the cascade conversion system 1g share the input power equally at each moment, which can meet the power demand during heavy load.

The load threshold is related to the rated load of the cascade conversion system 1g. For example, the load threshold is corresponding to 40%, 50%, 60%, or 80% of the rated load, or is even equal to the rated load. The load threshold can be set according to the specific circuit topology. Preferably but not exclusively, the load threshold is greater than 40% of the rated load.

In some embodiments, the load threshold is determined by comparing the efficiency of the cascade conversion system under different load conditions. When the cascade conversion system is operated in the non-equalized power mode, the efficiency of the cascade conversion system is changed with the load, and the changed curve is recorded as the first curve. When the cascade conversion system is operated in the equalized power mode, the efficiency of the cascade conversion system is also changed with the load, and the changed curve is recorded as the second curve. The load threshold may be configured to be equal to the load corresponding to the intersection point B of the first curve and the second curve. Notably, the load threshold may not be equal to the load corresponding to the intersection point of the first curve and the second curve. For example, the load threshold may be slightly larger than the load corresponding to the intersection point, or the load threshold may be slightly smaller than the load corresponding to intersection point.

Please refer to FIG. 16B. In the embodiment, the DC/DC conversion unit 25g in the power conversion module 2g is an LLC resonant converter. In some embodiments, the load threshold is determined based on the circuit parameters, such as the resonant inductor Lr, the resonant capacitor Cr, the magnetizing inductor Lm, the input voltage Vin, the output voltage Vo and the total system output power Po. Preferably but not exclusively, the load threshold corresponding to the circuit in FIG. 16B is 60% of the rated load. Certainly, if the circuit topology is changed or one or more circuit parameters are changed, the load threshold will also be changed accordingly.

Figure 19:
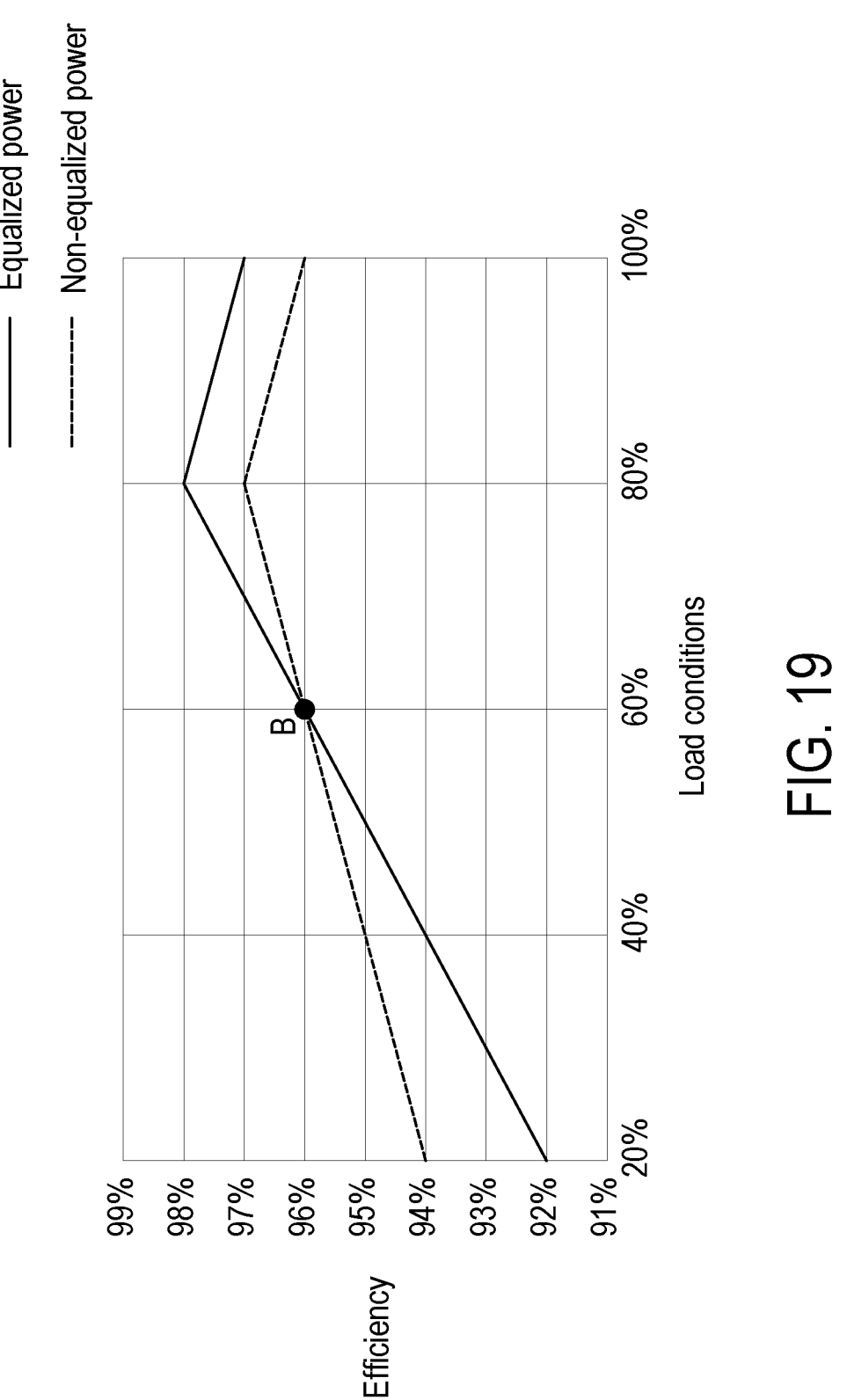
FIG. 19 is a schematic diagram illustrating efficiency-load condition curves of the cascaded power conversion system as shown in FIG. 16A operated in an equalized power mode and a non-equalized power mode respectively.

In some embodiments, the load threshold is also determined based on the efficiency curve, which is related to the circuit parameters, such as the resonant inductor Lr, the resonant capacitor Cr, the magnetizing inductor Lm, the input voltage Vin, the output voltage Vo and the total system output power Po. Please refer to FIG. 19 in conjunction with FIG. 16B. FIG. 19 is a schematic diagram illustrating efficiency-load condition curves of the cascaded power conversion system as shown in FIG. 16A operated in an equalized power mode and a non-equalized power mode respectively. As shown in FIG. 19, the solid line represents the efficiency-load condition curve of the cascade conversion system operated in the equalized power mode, and the dotted line represents the efficiency-load condition curve of the cascade conversion system operated in the non-equalized power mode. The intersection point of the two curves is B. The load corresponding to the intersection point B is equal to 60% of the rated load. When the load is less than 60% of the rated load, the efficiency of the cascaded power conversion system operated in the equalized power mode is smaller than the efficiency of the cascaded power conversion system operated in the non-equalized power mode. For example, when the load is equal to 20% of the rated load, the efficiency of the cascaded power conversion system operated in the equalized power mode is equal to 92%, and the efficiency of the cascaded power conversion system operated in the non-equalized power mode is equal to 94%. However, as the load is increased, the efficiency of the cascaded power conversion system operated in the equalized power mode and the efficiency of the cascaded power conversion system operated in the non-equalized power mode tend to be equal. When the load is greater than 60% of the rated loading, the efficiency of the cascaded power conversion system operated in the equalized power mode is greater than the efficiency of the cascaded power conversion system operated in the non-equalized power mode. For example, when the load is equal to 80% of the rated load, the efficiency of the cascaded power conversion system operated in the equalized power mode is equal to 98%, and the efficiency of the cascaded power conversion system operated in the non-equalized power mode is equal to 97%. Obviously, when the load is less than 60% of the rated load, operating in non-equalized power mode has a better effect on improving system efficiency. Alternatively, when the load is greater than 60% of the rated load, operating in the equalized power mode has a better effect on improving system efficiency. Therefore, the load threshold is set to 60% of the rated load, and the operating mode of the system is switched based on the comparison between the actual load and the load threshold, so that an optimal system efficiency is achieved.

Figure 20:
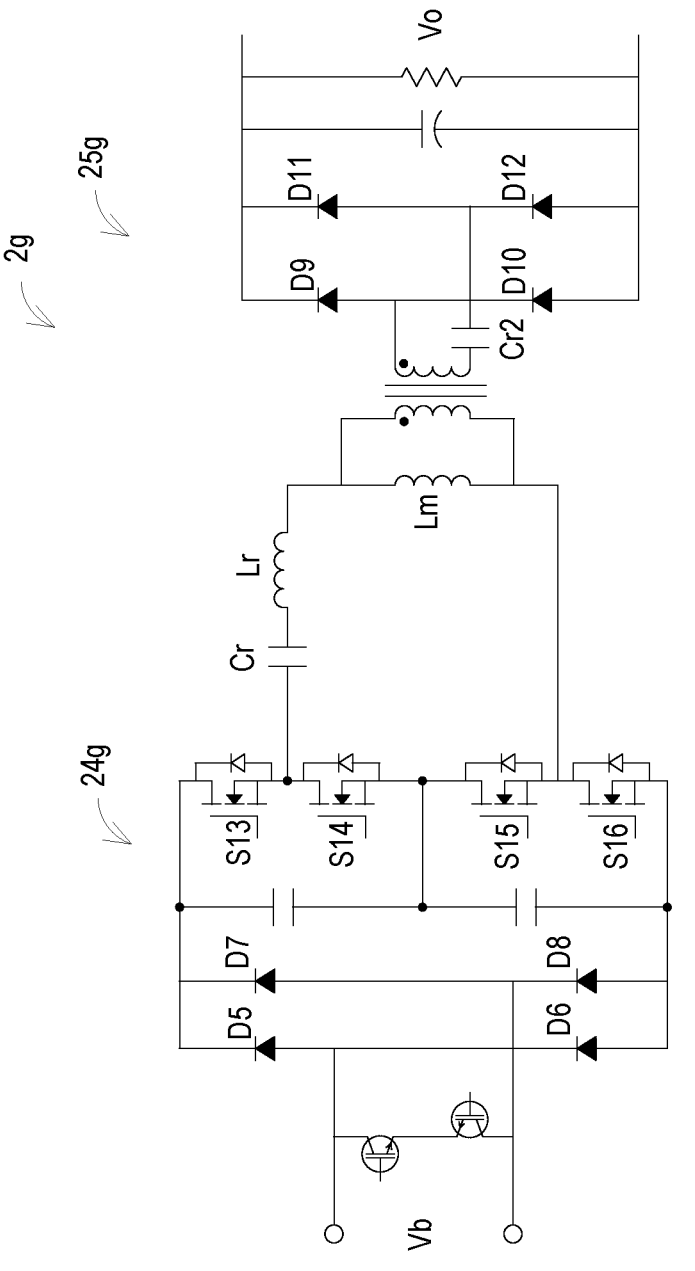
FIG. 20 is another schematic circuit diagram illustrating one power conversion module of the cascaded power conversion system as shown in FIG. 16A.

Please refer to FIG. 20 in conjunction with FIG. 16A. FIG. 20 is another schematic circuit diagram illustrating one power conversion module of the cascaded power conversion system as shown in FIG. 16A. In the embodiment, the DC/DC conversion unit 25g in the power conversion module 2g is an CLLC resonant converter. In some embodiments, the load threshold is determined based on the circuit parameters, such as the resonant inductor Lr, the resonant capacitor Cr1, Cr2, the magnetizing inductor Lm, the input voltage Vin, the output voltage Vo and the total system output power Po. Preferably but not exclusively, the load threshold corresponding to the circuit in FIG. 20 is 80% of the rated load. Certainly, if the circuit topology is changed or one or more circuit parameters are changed, the load threshold will also be changed accordingly.

Figure 21:
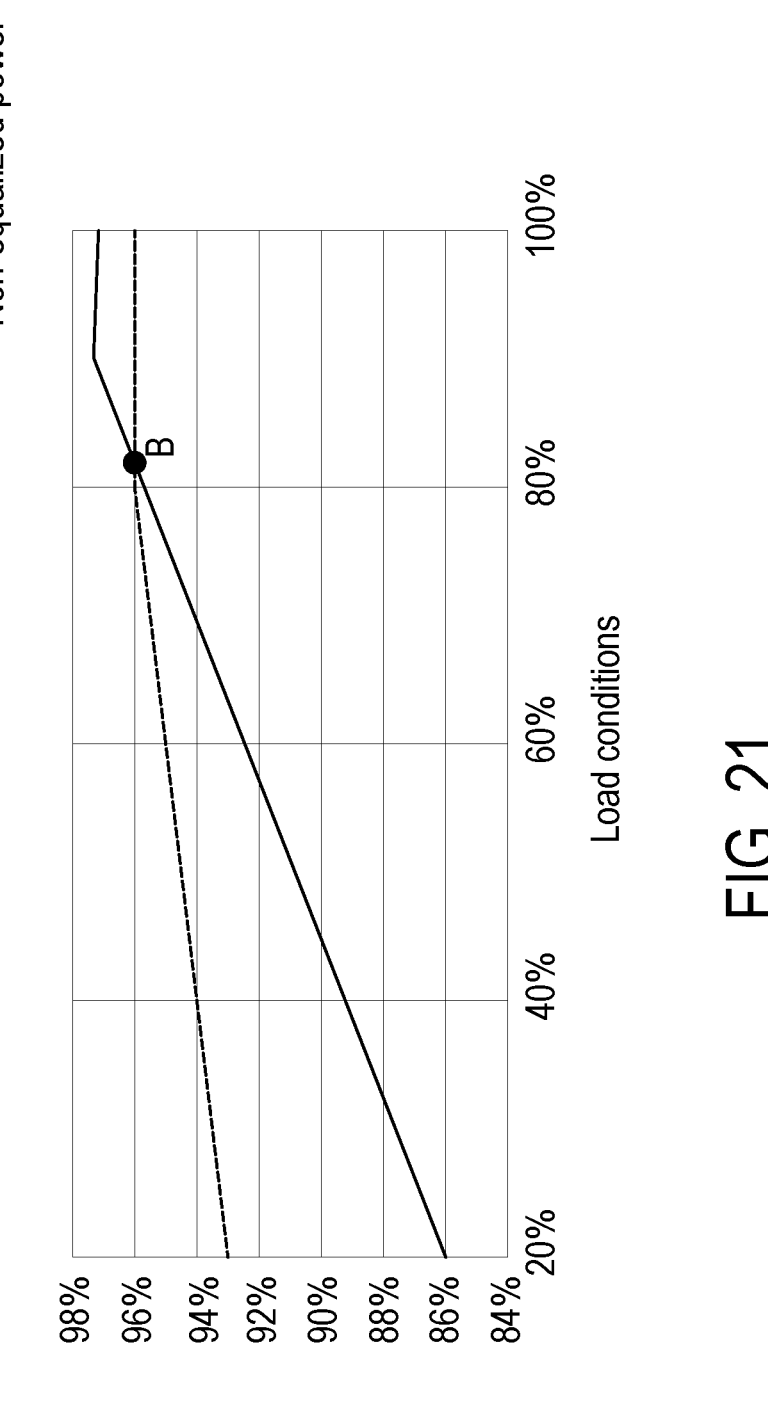
FIG. 21 is a schematic diagram illustrating efficiency-load condition curves of the cascaded power conversion system as shown in FIG. 20 operated in an equalized power mode and a non-equalized power mode respectively.

In some embodiments, the load threshold is also determined based on the efficiency curve, which is related to the circuit parameters, such as the resonant inductor Lr, the resonant capacitor Cr1, Cr2, the magnetizing inductor Lm, the input voltage Vin, the output voltage Vo and the total system output power Po. Please refer to FIG. 21 in conjunction with FIG. 20. FIG. 21 is a schematic diagram illustrating efficiency-load condition curves of the cascaded power conversion system as shown in FIG. 20 operated in an equalized power mode and a non-equalized power mode respectively. As shown in FIG. 21, the solid line represents the efficiency-load condition curve of the cascade conversion system operated in the equalized power mode, and the dotted line represents the efficiency-load condition curve of the cascade conversion system operated in the non-equalized power mode. The intersection point of the two curves is B. The load corresponding to the intersection point B is equal to 80% of the rated load. When the load is less than 80% of the rated load, the efficiency of the cascaded power conversion system operated in the equalized power mode is smaller than the efficiency of the cascaded power conversion system operated in the non-equalized power mode. When the load is greater than 80% of the rated load factor, the efficiency of the cascaded power conversion system operated in the equalized power mode is greater than the efficiency of the cascaded power conversion system operated in the non-equalized power mode. Therefore, the load threshold is set to 80% of the rated load, and the operating mode of the system is switched based on the comparison between the actual load and the load threshold, so that an optimal system efficiency is achieved.

From the above descriptions, the present disclosure provides a cascaded power conversion system and a control method for the cascaded power conversion system. The DC/DC conversion units in the N power conversion modules of the cascaded power conversion system are operated in a bypass mode, a boost mode and a hold mode. When the DC/DC conversion unit is operated in the bypass mode or the boost mode, the switching loss of the DC/DC conversion unit is low, and the power loss of the transformer in the DC/DC conversion unit is low. When the DC/DC conversion unit is operated in the hold mode or the bypass mode, the on-state loss of the DC/DC conversion unit is low. Moreover, when the AC/DC conversion unit of the power conversion module receives the AC input electric energy, the DC output electric energy is immediately outputted from the DC/DC conversion unit. Since it is not necessary to store electric energy in the bus capacitor of the DC bus of the power conversion module, the bus capacitor with a low capacitance value and a small volume is feasible. As a consequence, the cost of the cascaded power conversion system is reduced.

Furthermore, the cascade conversion system of the present disclosure can also switch operating modes according to load conditions to improve operating efficiency across the full load range. When the load is less than the load threshold, the cascade conversion system of the present disclosure is operated in the above-mentioned non-equalized power mode, and the DC/DC conversion units of all power conversion modules are selectively operated in the bypass mode, the boost mode or the hold mode. When the load is greater than or equal to the load threshold, the cascade conversion system of the present disclosure is operated in the equalized power mode, all power conversion modules share the input power equally, and the DC/DC conversion units of all power conversion modules are operated in the boost mode.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cascaded power conversion system, comprising:
   N power conversion modules and each of the N power conversion modules comprising:
   an input terminal and an output terminal;
   a DC bus having a DC bus voltage;
   an AC/DC conversion unit electrically connected between the input terminal and the DC bus; and
   a DC/DC conversion unit electrically connected between the DC bus and the output terminal;
   wherein the input terminals of the N power conversion modules are electrically connected between two terminals of an input power source to receive an AC input power having an AC input voltage; and
   wherein in every ¼ period of the AC input voltage, the DC/DC conversion units of the N power conversion modules are operated in a bypass mode, a boost mode and a hold mode, and a total voltage of the DC bus voltages of the N power conversion modules are changed in a consecutive manner.

2. The cascaded power conversion system according to claim 1, wherein when the DC/DC conversion unit in a specified power conversion module of the N power conversion modules is operated in the bypass mode, the AC/DC conversion unit in the specified power conversion module is operated in the bypass mode, wherein when the DC/DC conversion unit in the specified power conversion module is operated in the boost mode or the hold mode, the AC/DC conversion unit in the specified power conversion module is operated in a low frequency rectification mode.

3. The cascaded power conversion system according to claim 1, further comprising a control unit configured to:
   acquire N reference voltages;
   distribute the N reference voltages to the N power conversion modules respectively; and
   determine an operating mode of the DC/DC conversion unit of the power conversion module according to a corresponding reference voltage.

4. The cascaded power conversion system according to claim 3, wherein the control unit is further configured to:
   compare the reference voltage corresponding to a specified power conversion module with a first threshold value and a second threshold value;
   determine a DC/DC conversion unit in the specified power conversion module to be operated in the hold mode when the reference voltage is equal to the first threshold value;
   determine the DC/DC conversion unit in the specified power conversion module to be operated in the boost mode when the reference voltage is lower than the first threshold value and greater than the second threshold value; and
   determine the DC/DC conversion unit in the specified power conversion module to be operated in the bypass mode when the reference voltage is lower than the second threshold value;
   wherein the first threshold value corresponding to the specified power conversion module is equal to a product of an output voltage of the specified power conversion module and a transformation ratio of the DC/DC conversion unit in the specified power conversion module, and the second threshold value corresponding to the specified power conversion module is zero or a positive voltage close to zero.

5. The cascaded power conversion system according to claim 3, wherein in every ¼ period of the AC input voltage, an amplitude of the reference voltage corresponding to a specified power conversion module is equal to a product of an output voltage of the specified power conversion module and a transformation ratio of the DC/DC conversion unit in the specified power conversion module.

6. The cascaded power conversion system according to claim 3, wherein in every ¼ period of the AC input voltage, a first reference voltage of the N reference voltages is equal to |Vin| or $n_1$Vo1; wherein when the first reference voltage is equal to |Vin|, a DC/DC conversion unit in a corresponding power conversion module is operated in the boost mode, and when the first reference voltage is equal to $n_1$Vo1, the DC/DC conversion unit in the corresponding power conversion module is operated in the hold mode; and wherein Vin is the AC input voltage, $n_1$ is a transformation ratio of the DC/DC conversion unit in the corresponding power conversion module, and Vo1 is an output voltage of the corresponding power conversion module.

7. The cascaded power conversion system according to claim 3, wherein in every ¼ period of the AC input voltage, an i-th reference voltage of the N reference voltages is equal to 0, $$|V\,in| - \sum\nolimits_{m=1}^{i-1} n_m\,Vom$$

and $n_i$Voi; wherein when the i-th reference voltage is equal to 0, a DC/DC conversion unit in a corresponding power conversion module is operated in the bypass mode, when the i-th reference voltage is equal to $$|V\,in| - \sum\nolimits_{m=1}^{i-1} n_m\,Vom,$$

the DC/DC conversion unit in the corresponding power conversion module is operated in the boost mode, and when the i-th reference voltage is equal to $n_i$Voi, the DC/DC conversion unit in the corresponding power conversion module is operated in the hold mode; and wherein Vin is the AC input voltage, $n_i$ is a transformation ratio of the DC/DC conversion unit in the corresponding power conversion module, Voi is an output voltage of the corresponding power conversion module, and i is a positive integer larger than 1 and smaller than N.

8. The cascaded power conversion system according to claim 3, wherein in every ¼ period of the AC input voltage, a N-th reference voltage of the N reference voltages is equal to 0 or $$|V\,in| - \sum\nolimits_{m=1}^{i-1} n_m\,Vom;$$

wherein when the N-th reference voltage is equal to 0, a DC/DC conversion unit in a corresponding power conversion module is operated in the bypass mode, and when the N-th reference voltage is equal to $$|V\,in| - \sum\nolimits_{m=1}^{i-1} n_m\,Vom,$$

36 the DC/DC conversion unit in the corresponding power conversion module is operated in the boost mode, wherein Vin is the AC input voltage.

9. The cascaded power conversion system according to claim 1, wherein a total voltage of the DC bus voltages of the N power conversion modules is equal to an absolute of the AC input voltage.

10. The cascaded power conversion system according to claim 3, wherein the AC input voltage is cut transversely to obtain N segmented voltages as the N reference voltages.

11. The cascaded power conversion system according to claim 3, wherein the N reference voltages are distributed to the N power conversion modules sequentially, and an i-th reference voltage of the N reference voltages is a reference value of the DC bus voltage of an i-th power conversion module.

12. The cascaded power conversion system according to claim 11, wherein output voltages of the N power conversion modules are equal, and a sequence of distributing the N reference voltages is adjusted at an interval of a set time.

13. The cascaded power conversion system according to claim 1, wherein the output terminal of the power conversion module is electrically connected with a load, and a loading factor of the load is lower than or equal to 50% of a rated loading factor.

14. A power distribution method for a cascaded power conversion system, the cascaded power conversion system comprising N power conversion modules for receiving an AC input power having an AC input voltage, each of the N power conversion modules comprising an AC/DC conversion unit, a DC bus and a DC/DC conversion unit, and the power distribution method comprising:
    acquiring N reference voltages;
    distributing the N reference voltages to the N power conversion modules respectively; and
    selecting an operating mode of the DC/DC conversion unit in each of the N power conversion modules from a bypass mode, a boost mode and a hold mode according to the corresponding reference voltage.

15. The power distribution method according to claim 14, wherein in every ¼ period of the AC input voltage, operating modes of the DC/DC conversion units of the N power conversion modules includes a bypass mode, a boost mode and a hold mode.

16. The power distribution method according to claim 14, further comprising:
    cutting an AC input voltage of the AC input electric energy transversely to obtain N segmented voltages as the N reference voltages.

17. The power distribution method according to claim 14, further comprising:
    operating an AC/DC conversion unit of a specified power conversion module in the bypass mode when selectively operating a DC/DC conversion unit of the specified power conversion module in the bypass mode; and
    operating the AC/DC conversion unit of the specified power conversion module in a low frequency rectification mode when selectively operating the DC/DC conversion unit of the specified power conversion module in the boost mode or the hold mode.

18. The power distribution method according to claim 14, further comprising:
    comparing a reference voltage corresponding to a specified power conversion module with a first threshold value and a second threshold value;

selectively operating a DC/DC conversion unit of the specified power conversion module in the hold mode when the reference voltage is equal to the first threshold value;

selectively operating the DC/DC conversion unit of the specified power conversion module in the boost mode when the reference voltage is lower than the first threshold value and greater than a second threshold value; and selectively operating the DC/DC conversion unit of the specified power conversion module in the bypass mode when the reference voltage corresponding to the specified power conversion module is lower than the second threshold value;

wherein the first threshold value corresponding to the specified power conversion module is equal to a product of an output voltage of the specified power conversion module and a transformation ratio of the DC/DC conversion unit, and the second threshold value corresponding to the specified power conversion module is zero or a positive voltage close to zero.

19. The power distribution method according to claim 14, wherein in every ¼ period of the AC input voltage, an amplitude of a reference voltage corresponding to a specified power conversion module is equal to a product of an output voltage of the specified power conversion module and a transformation ratio of a DC/DC conversion unit in the specified power conversion module.

20. The power distribution method according to claim 14, wherein in every ¼ period of the AC input voltage, a total voltage of DC bus voltages of the N power conversion modules is changed in a consecutive manner.

21. The power distribution method according to claim 14, further comprising:

distributing the N reference voltages to the N power conversion modules sequentially, such that an i-th reference voltage is a reference value of a DC bus voltage of an i-th power conversion module of the N power conversion modules.

22. The power distribution method according to claim 21, wherein output voltages of the N power conversion modules are equal, and adjust a sequence of distributing the N reference voltages at an interval of a set time.

23. A cascaded power conversion system, comprising:

an AC/DC conversion unit, wherein an input terminal of the AC/DC conversion unit is electrically connected with an input power source to receive an AC input power having an AC input voltage;

N DC buses electrically connected with an output terminal of the AC/DC conversion unit; and N DC/DC conversion units, wherein an input terminal of each DC/DC conversion unit is electrically connected with a corresponding DC bus;

wherein in every ¼ period of the AC input voltage, the N DC/DC conversion units are operated in a bypass mode, a boost mode and a hold mode, and a total voltage of DC bus voltages of the N DC buses are changed in a consecutive manner.

* * * * *